United States Patent
Li et al.

(10) Patent No.: US 11,888,627 B2
(45) Date of Patent: Jan. 30, 2024

(54) CONFIGURATION AND/OR ACTIVATION METHOD FOR DUPLICATION TRANSMISSION, METHOD FOR DUPLICATION TRANSMISSION AND APPARATUSES THEREOF

(71) Applicant: FUJITSU LIMITED, Kawasaki (JP)

(72) Inventors: Guorong Li, Beijing (CN); Meiyi Jia, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 17/141,929

(22) Filed: Jan. 5, 2021

(65) Prior Publication Data
US 2021/0126746 A1 Apr. 29, 2021

Related U.S. Application Data

(63) Continuation of application No. PCT/CN2018/099461, filed on Aug. 8, 2018.

(51) Int. Cl.
*H04L 1/1867* (2023.01)
*H04L 1/1829* (2023.01)
(Continued)

(52) U.S. Cl.
CPC ............ *H04L 1/1858* (2013.01); *H04L 1/189* (2013.01); *H04L 1/1819* (2013.01);
(Continued)

(58) Field of Classification Search
CPC . H04W 76/15; H04W 72/048; H04W 72/042; H04W 80/02; H04W 72/14;
(Continued)

(56) References Cited

U.S. PATENT DOCUMENTS

| | | |
|---|---|---|
| 2012/0023259 A1 | 1/2012 | Salovuori et al. |
| 2013/0188582 A1 | 7/2013 | Dinan |

(Continued)

FOREIGN PATENT DOCUMENTS

| | | |
|---|---|---|
| CN | 101267240 A | 9/2008 |
| CN | 107342851 A | 11/2017 |

(Continued)

OTHER PUBLICATIONS

Adaptive Resource Scheduling for Dual Connectivity in Heterogeneous IoT Cellular Networks, Wooseong Kim, Gachon University (Year: 2015).*

(Continued)

*Primary Examiner* — Salvador E Rivas
(74) *Attorney, Agent, or Firm* — Myers Wolin, LLC

(57) ABSTRACT

A configuration and/or activation method for duplication transmission, method for duplication transmission and apparatuses thereof. A UE configured with operations of carrier aggregation and/or at least two pieces of connectivity is configured with a message for duplication transmission and/or activation/deactivation signaling for duplication transmission, hence, duplication transmission having three or more transmission legs may be supported. Certain embodiments provide a UE configured as multi-connectivity or carrier aggregation of multi-leg, a leg of relatively good quality may be used for duplication transmission of data, which may provide gains of the duplication transmission to reliability of data transmission.

20 Claims, 16 Drawing Sheets

(51) Int. Cl.
*H04W 76/15* (2018.01)
*H04W 76/27* (2018.01)
*H04L 5/00* (2006.01)
*H04W 28/06* (2009.01)
*H04L 1/1812* (2023.01)
*H04W 74/08* (2009.01)

(52) U.S. Cl.
CPC ............ *H04L 5/0055* (2013.01); *H04W 28/06* (2013.01); *H04W 76/15* (2018.02); *H04W 76/27* (2018.02); *H04W 74/0808* (2013.01)

(58) Field of Classification Search
CPC ............. H04W 74/0808; H04L 1/1819; H04L 5/0032; H04L 1/189; H04L 1/1858; H04K 3/255
See application file for complete search history.

(56) References Cited

U.S. PATENT DOCUMENTS

| | | | |
|---|---|---|---|
| 2018/0324641 A1* | 11/2018 | Tsai | H04L 1/08 |
| 2018/0368107 A1* | 12/2018 | Babaei | H04L 1/1838 |
| 2018/0368132 A1* | 12/2018 | Babaei | H04L 1/1819 |
| 2019/0069195 A1* | 2/2019 | Makinen | H04W 28/0268 |
| 2020/0266962 A1 | 8/2020 | Chen et al. | |
| 2021/0115296 A1 | 4/2021 | Kim et al. | |
| 2021/0235536 A1* | 7/2021 | Shih | H04W 72/04 |
| 2021/0297899 A1* | 9/2021 | Baek | H04W 28/06 |

FOREIGN PATENT DOCUMENTS

| | | |
|---|---|---|
| EP | 3 641 188 A1 | 4/2020 |
| JP | 2020-524936 A | 8/2020 |
| JP | 2020-532228 A | 11/2020 |
| WO | 2019/037586 A1 | 2/2019 |

OTHER PUBLICATIONS

R2-1707771,"Impact of duplication on RLC", Aug. 21-25, 2017, pp. 1-3 (Year: 2017).*
R2-1707712, "Design of MAC CE for duplicate activation/deactivation", Aug. 21-25, 2017, pp. 1-2 (Year: 2017).*
3GPP, "ETSI TR 138 912 V.14.1.0", Oct. 2017, pp. 1-78 (Year: 2017).*
Notice of Reasons for Refusal issued by the Japan Patent Office for corresponding Japanese Patent Application No. 2021-500598 dated Mar. 22, 2022.
Huawei et al., "Evaluation on packet duplication in multi-connectivity", Agenda Item: 3.2.1.1, 3GPP TSG RAN2 NR Ad Hoc, R2-1700172, Spokane, Washington, US, Jan. 17-19, 2017.
Huawei et al., "Configuration and control of packet duplication", Agenda Item: 10.2.2.4, 3GPP TSG RAN WG2 NR Ad Hoc, R2-1706716, Qingdao, China, Jun. 27-29, 2017.
International Search Report and Written Opinion of the International Searching Authority issued by State Intellectual Property Office of the P.R. China for the corresponding International Patent Application No. PCT/CN2018/099461, dated Feb. 27, 2019, with an English translation.
First Notification of Office Action and Search Report issued by the China National Intellectual Property Administration for corresponding Chinese Patent Application No. 201880095481.5, dated May 25, 2023, with an English translation.
OPPO, Discussion on duplication in eV2x mode-4, Agenda Item: 9.10.2, 3GPP TSG-RAN2 Meeting #101bis, R2-1804361, revision of R2-1801852, Sanya, China, Apr. 16-20, 2018.

* cited by examiner

CONFIGURATION AND/OR ACTIVATION METHOD FOR DUPLICATION TRANSMISSION, METHOD FOR DUPLICATION TRANSMISSION AND APPARATUSES THEREOF

CROSS-REFERENCE TO RELATED APPLICATION

This application is a continuation application of International Application PCT/CN2018/099461 filed on Aug. 8, 2018 and designated the U.S., the entire contents of which are incorporated herein by reference.

TECHNICAL FIELD

This disclosure relates to the field of communication technologies, and in particular to a configuration and/or activation method for duplication transmission, a method for duplication transmission and apparatuses thereof.

BACKGROUND

When a network device (ND) and a user equipment (UE) perform data transmission, a data transmitting entity may adopt a split transmission mode, that is, transmitting different data on different links; for example, in performing transmission of packet data convergence protocol (PDCP) data, different PDCP protocol data units (PDUs) may be transmitted on different legs.

In recent years, various data applications and services based on mobile communication networks have grown rapidly, and terminals served by mobile communication networks have expanded from traditional human-based smartphone terminals to more machine-based other types of terminals. In order to be adapted to such a changing trend, future mobile communication networks need to be able to provide more flexible and diverse services to meet demands of different terminal equipments and different services. In order to achieve this goal, in addition to traditional enhanced mobile broadband (eMBB) services, a 5G communications system also supports massive machine type communications (mMTC) services and ultra-reliable and low latency communications (URLLC) services.

In order to support ultra-reliable data transmission, a next-generation system will support a duplication transmission mode of packet data convergence protocol PDCP data, that is, identical data are transmitted on different legs. For example, identical PDCP PDUs are transmitted on different legs. Use of diversity gains of transmitting identical data on multiple different links may reduce an error probability of data transmission and ensure service reliability.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Existing New Radio (NR) systems support a duplication transmission mechanism using carrier aggregation (CA) or dual connectivity (DC). For example, a UE duplicately transmits identical data in a carrier aggregation manner connected to a network device or a cell group, or a UE configured with dual connectivity duplicately transmits identical data via two network devices or two cell groups.

In an NR system, whether a data radio bearer (DRB) supports duplication transmission may be configured via RRC signaling. For example, in the RRC signaling, for a DRB, a pdcp-Duplication field of "1" indicates that the DRB supports duplication transmission, and a pdcp-Duplication field of "0" indicates that the DRB does not support duplication transmission.

In addition, an activation status of duplication transmission of a DRB related to a MAC entity may be indicated to the UE by a control element (CE) of a MAC layer. For example, in the MAC CE used to indicate the activation status of duplication transmission, an activation status of at least one DRB related to the MAC entity is arranged in a reverse order from left to right. For a DRB, "1" denotes that a status of duplication transmission of the DRB is activated, and "0" denotes that a status of duplication transmission of the DRB is deactivated. For example, that the status of duplication transmission is activated denotes transmitting identical data by using different legs, and that the status of duplication transmission is deactivated denotes transmitting different data by using different legs, that is, using a split transmission mode.

For example, for a UE configured with dual connectivity, it has two MAC entities, corresponding respectively to a master cell group (MCG) and a secondary cell group (SCG), and these two MAC entities respectively receive a MAC CE corresponding to the MCG and used for indicating the activation status of the duplication transmission and a MAC CE corresponding to the SCG and used for indicating the activation status of the duplication transmission. After receiving a corresponding MAC CE, the MAC entity of the UE learns an activation status of duplication transmission of at least one DRB related thereto, and forwards the activation status to a PDCP entity of the DRB, and the PDCP entity performs activation and/or deactivation of the duplication transmission, and performs duplication transmission of a PDCP via a radio link control (RLC) entity and logical channel corresponding to the PDCP entity; wherein one logical channel corresponds to one RLC entity.

In a next release of 3GPP, a mode supporting use of multiple connectivities (MC) may be adopted to further improve reliability of data transmission. For example, it may support configuring the UE to form multiple connectivities with three or more network devices or cell groups. Furthermore, it may support multi-leg carrier aggregation transmission of three or more RLC entities and/or logical channels. For a DRB configured with duplication transmission, an RLC entity and/or logical channel to which it corresponds may be referred to as a leg. However, duplication transmission of only two legs is supported currently. For example, for a DRB performing duplication transmission in a carrier aggregation mode, its two RLC entities and/or logical channels perform duplication transmission within a network or a cell group; and for a DRB performing duplication transmission in a DC mode, its two RLC entities and/or logical channels perform duplication transmission in two network devices or cell groups. Duplication transmission of three or more legs is not supported currently. Hence, for a case where three or more transmission legs exist, there is no effective configuration and/or activation method for duplication transmission.

Embodiments of this disclosure provide a configuration and/or activation method for duplication transmission, in which a configuration message used for duplication transmission and/or activation/deactivation signaling used for duplication transmission is/are transmitted to a UE configured with operations of carrier aggregation and/or at least two connectivities, hence, duplication transmission having three or more transmission legs may be supported. And when the UE is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiments of this disclosure provide a method for duplication transmission, in which a UE configured with operations of carrier aggregation and/or at least two connectivities determines a leg for performing duplication transmission by itself, and duplication transmission having three or more transmission legs may also be supported, and gains of the duplication transmission to reliability of data transmission and relatively high radio resource utilization may be ensured. And as configuration and/or activation/deactivation signaling used for duplication transmission from a network device side need(s) not to be received, signaling overhead of the network device may be saved, occupation of radio resources may be lowered, and network implementation algorithm may be simplified.

According to a first aspect of the embodiments of this disclosure, there is provided a configuration and/or activation apparatus for duplication transmission, including: a first transmitting unit configured to transmit a first configuration message for configuring a UE to perform operations of carrier aggregation and/or at least two connectivities to the UE; and a second transmitting unit configured to transmit second configuration message for duplication transmission, and/or activation/deactivation signaling for duplication transmission, to the UE.

According to a second aspect of the embodiments of this disclosure, there is provided an apparatus for duplication transmission, including: a first receiving unit configured to receive from a network device a first configuration message for configuring a UE to perform operations of carrier aggregation and/or at least two connectivities; and a second receiving unit configured to receive a second configuration message for duplication transmission, and/or activation/deactivation signaling for duplication transmission, from the network device.

According to a third aspect of the embodiments of this disclosure, there is provided an apparatus for duplication transmission, including: a third receiving unit configured to receive a first configuration message for performing operations of carrier aggregation and/or at least two connectivities; and a third determining unit configured to determine a leg used for performing duplication transmission.

According to a fourth aspect of the embodiments of this disclosure, there is provided a network device, including the apparatus as described in the first aspect.

According to a fifth aspect of the embodiments of this disclosure, there is provided a UE, including the apparatus as described in the second aspect and/or the apparatus as described in the third aspect.

According to a sixth aspect of the embodiments of this disclosure, there is provided a communications system, including the network device as described in the fourth aspect and/or the UE as described in the fifth aspect.

According to a seventh aspect of the embodiments of this disclosure, there is provided a configuration and/or activation method for duplication transmission, including: transmitting a first configuration message for configuring a UE to perform operations of carrier aggregation and/or at least two connectivities to the UE; and transmitting a second configuration message for duplication transmission, and/or activation/deactivation signaling for duplication transmission, to the UE.

According to an eighth aspect of the embodiments of this disclosure, there is provided a method for duplication transmission, including: receiving from a network device a first configuration message for configuring a UE to perform operations of carrier aggregation and/or at least two connectivities; and receiving a second configuration message for duplication transmission, and/or activation/deactivation signaling for duplication transmission, from the network device.

According to a ninth aspect of the embodiments of this disclosure, there is provided a method for duplication transmission, including: receiving by a UE a first configuration message for performing operations of carrier aggregation and/or at least two connectivities; and determining by the UE a leg used for performing duplication transmission.

According to a tenth aspect of the embodiments of this disclosure, there is provided a computer readable program, which, when executed in a configuration and/or activation apparatus for duplication transmission or a network device, will cause the configuration and/or activation apparatus for duplication transmission or the network device to carry out the configuration and/or activation method for duplication transmission described in the seventh aspect.

According to an eleventh aspect of the embodiments of this disclosure, there is provided a computer storage medium, including a computer readable program, which will cause a configuration and/or activation apparatus for duplication transmission or a network device to carry out the configuration and/or activation method for duplication transmission described in the seventh aspect.

According to a twelfth aspect of the embodiments of this disclosure, there is provided a computer readable program, which, when executed in an apparatus for duplication transmission or a UE, will cause the apparatus for duplication transmission or the UE to carry out the method for duplication transmission described in the eighth aspect.

According to a thirteenth aspect of the embodiments of this disclosure, there is provided a computer storage medium, including a computer readable program, which will cause an apparatus for duplication transmission or a UE to carry out the method for duplication transmission described in the eighth aspect.

According to a fourteenth aspect of the embodiments of this disclosure, there is provided a computer readable program, which, when executed in an apparatus for duplication transmission or a UE, will cause the apparatus for duplication transmission or the UE to carry out the method for duplication transmission described in the ninth aspect.

According to a fifteenth aspect of the embodiments of this disclosure, there is provided a computer storage medium, including a computer readable program, which will cause an apparatus for duplication transmission or a UE to carry out the method for duplication transmission described in the ninth aspect.

An advantage of the embodiments of this disclosure exists in that a configuration message used for duplication transmission and/or activation/deactivation signaling used for duplication transmission is/are transmitted to a UE configured with operations of carrier aggregation and/or at least two connectivities, hence, duplication transmission having three or more transmission legs may be supported. And when the UE is configured with multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
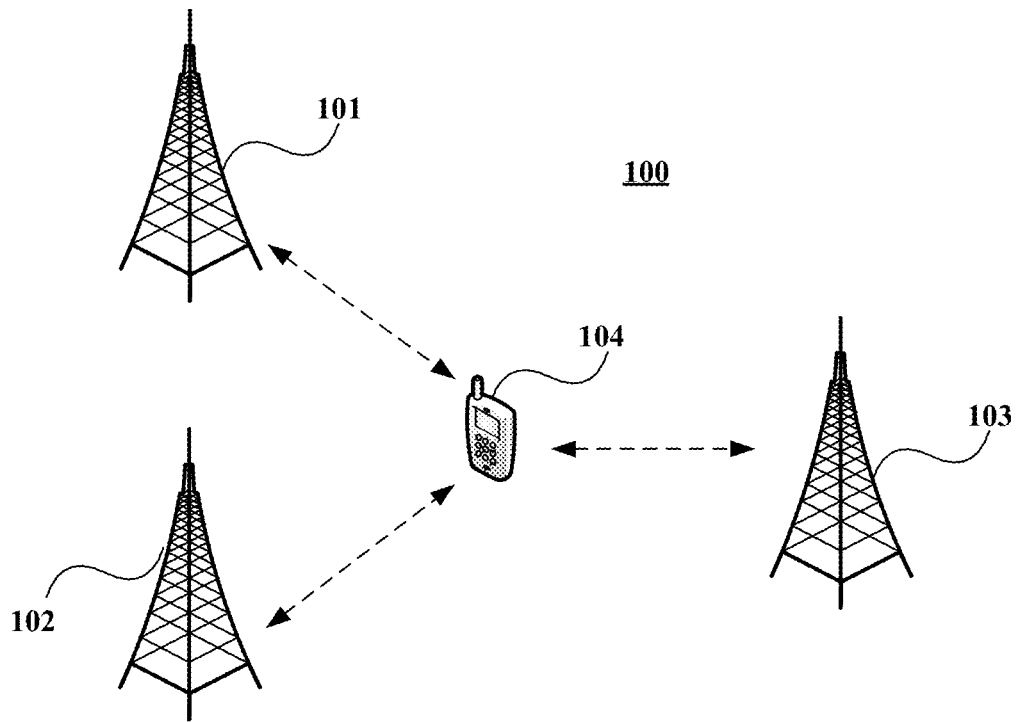
FIG. 1 is a schematic diagram of a communications system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, "multiple" or "a plurality of" refers to at least two.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communications system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communications system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

In the embodiments of this disclosure, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communications system of an embodiment of this disclosure, in which a case where a user equipment and network devices are taken as examples is schematically shown. As shown in FIG. 1, a communications system 100 may include a first network device 101, a second network device 102, a third network device 103 and a user equipment 104. For the sake of simplicity, description is given in FIG. 1 by taking one user equipment and one network as examples; however, the embodiment of this disclosure is not limited thereto.

In the embodiment of this disclosure, the user equipment 104 is configured that the first network device 101, the second network device 102, the third network device 103 and the user equipment 104 form multiple connectivity, and existing traffics or traffics that may be implemented in the future may be performed between the first network device 101, the second network device 102, the third network device 103 and the user equipment 104. For example, such traffics may include but not limited to enhanced mobile broadband (eMBB), massive machine type communication (MTC), and ultra-reliable and low-latency communication (URLLC), etc.

Embodiment 1

The embodiment of this disclosure provides a configuration and/or activation method for duplication transmission, which is applicable to a network device side.

Figure 2:
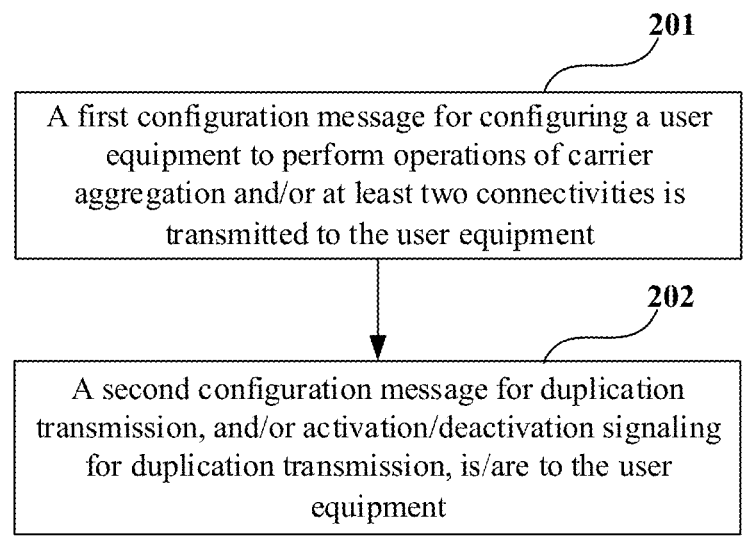
FIG. 2 is a schematic diagram of the configuration and/or activation method for duplication transmission of Embodiment 1 of this disclosure.

FIG. 2 is a schematic diagram of the configuration and/or activation method for duplication transmission of Embodiment 1 of this disclosure. As shown in FIG. 2, the method includes:

Step 201: a first configuration message for configuring a user equipment to perform operations of carrier aggregation and/or at least two connectivities is transmitted to the user equipment; and Step 202: a second configuration message for duplication transmission, and/or activation/deactivation signaling for duplication transmission, is/are to the user equipment.

Thus, the configuration message used for duplication transmission and/or the activation/deactivation signaling used for duplication transmission is/are transmitted to the user equipment configured with operations of carrier aggregation and/or at least two connectivities, hence, duplication transmission having three or more transmission legs may be supported. And when the user equipment is configured with multi-connectivity or carrier aggregation of multi-leg, a leg of relatively good quality may be used for duplication transmission of data, which ensures gains of the duplication transmission to reliability of data transmission, radio resources will not be occupied too much, and relatively high radio resource utilization may be ensured.

In step 201, the first configuration message transmitted to the user equipment may include configuration information of at least one cell group, that is, including configuration information of a master cell group or configuration information of a master cell group and at least one secondary cell group. In addition, the first configuration message may be transmitted via radio resource control (RRC) signaling.

In this embodiment, "carrier aggregation" refers to aggregating multiple component carriers together, each carrier having a serving cell configured for a user equipment to achieve a larger transmission bandwidth.

In this embodiment, "at least two connectivities" is also referred to as multiple connectivities (MC), which includes dual connectivity (DC) and three or more connectivities. In other words, a user equipment configured with at least two connectivities is connected to at least two network devices or cell groups. For example, it is connected to three or more network devices or cell groups.

In this embodiment, "a leg" may include at least one of the following: a network device, a node, a cell group, an MAC entity, and an RLC entity and/or logical channel related to at least one of the network device, the node, the cell group and the MAC entity.

For example, when the mode of carrier aggregation is used for performing duplication transmission, the leg may be an RLC entity and/or a logical channel; and when the mode of "at least two connectivities" is used for performing duplication transmission, the leg may be at least one of a network device, a node, a cell group and an MAC entity, and/or an RLC entity and/or a logical channel of the network device/the node/the cell group/the MAC entity.

In step 202, the second configuration message for duplication transmission and/or the activation/deactivation signaling for duplication transmission is/are transmitted to the user equipment. That is, the second configuration message and/or activation/deactivation signaling for duplication transmission is/are transmitted to the user equipment that is the same as the transmission object of the first configuration message in step 201.

In this embodiment, the second configuration message may be configuring at least one DRB of the user equipment with whether the DRB supports duplication transmission.

In this embodiment, an activation/deactivation signalling for duplication transmission may be an indication for duplication activation and/or deactivation.

In this embodiment, the activation of duplication transmission may be that at least one DRB related to the MAC entity uses different legs to transmit identical data, and the deactivation of duplication transmission means that the DRB does not use a leg to transmit data, or uses a single leg to transmit data, or uses different legs to transmit different data, that is, using a split transmission mode.

In step 202, only the second configuration message for duplication transmission may be transmitted, or only the activation/deactivation signaling for duplication transmission may be transmitted, or the second configuration message for duplication transmission and the activation/deactivation signaling for duplication transmission may be transmitted.

In this embodiment, the first configuration message and the second configuration message may be the same message. In other words, information in the first configuration message and information in the second configuration message may be contained in the same message (such as an RRC reconfiguration message, or an RRC resume message, etc.). For example, the network device transmits a configuration message containing the information in the first configuration message and the information in the second configuration message to the user equipment, in which case transmission of the first configuration message in step 201 and transmission of the second configuration message in step 202 are performed in a combined manner.

In this embodiment, the network device transmitting the first configuration message to the user equipment and the network device transmitting the second configuration message and/or the activation/deactivation signaling to the user equipment may be the same network device, or may be different network devices, which is not limited in the embodiment of this disclosure.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured with multi-connectivity or carrier aggregation of multi-leg, a leg of relatively good quality may be used for duplication transmission of data, which ensures gains of the duplication transmission to reliability of data transmission, radio resources will not be occupied too much, and relatively high radio resource utilization may be ensured.

Embodiment 2

The embodiment of this disclosure provides a configuration and/or activation method for duplication transmission, which further describes the configuration method for duplication transmission in Embodiment 1, and is applicable to a network device side.

Figure 3:
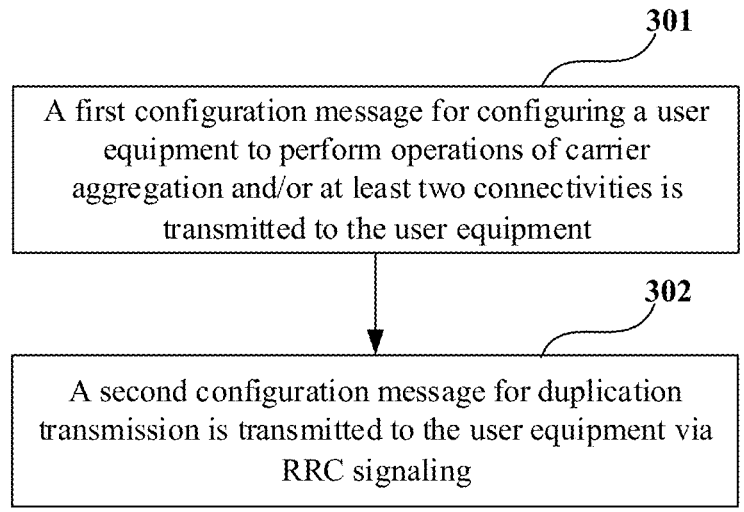
FIG. 3 is a schematic diagram of the configuration and/or activation method for duplication transmission of Embodiment 2 of this disclosure.

FIG. 3 is a schematic diagram of the configuration and/or activation method for duplication transmission of Embodiment 2 of this disclosure. As shown in FIG. 3, the method includes:

Step 301: a first configuration message for configuring a user equipment to perform operations of carrier aggregation and/or at least two connectivities is transmitted to the user equipment; and Step 302: a second configuration message for duplication transmission is transmitted to the user equipment via RRC signaling.

In this embodiment, step 301 is identical to step 201 in Embodiment 1, and shall not be described herein any further.

In this embodiment, step 302 is further description of transmitting the second configuration message in step 202 in Embodiment 1.

In this embodiment, the RRC signaling transmitting the second configuration message may be, for example, an RRCreconfiguration message, or an RRCresume message, or an RRCSetup message, or an RRCReestablishment message.

In this embodiment, a DRB of the user equipment may be configured with whether it supports duplication transmission. For example, the user equipment has at least one MAC entity corresponding to a network device or cell group to which the user equipment is connected, the number of DRB related to the MAC entity being at least one.

In this embodiment, the second configuration message transmitted to the user equipment may include at least one piece of the following information: information on a leg used by at least one DRB in performing duplication transmission; information on whether at least one leg is able to be used for duplication transmission; and information on a DRB using at least one leg configured to be used for duplication transmission.

In this embodiment, the information on a leg used by at least one DRB in performing duplication transmission may include at least one of the following: a network device identifier, a cell group identifier, a radio link control (RLC) entity identifier and a logic channel identifier used by the at least one DRB in performing duplication transmission; the information on whether at least one leg is able to be used for duplication transmission may include: information on whether at least one network device or at least one cell group is able to be used for duplication transmission; and the information on a DRB using at least one leg configured to be used for duplication transmission may include: information on a DRB using at least one network device or cell group configured to be used for duplication transmission, such as an identifier or index of the DRB.

Figure 4:
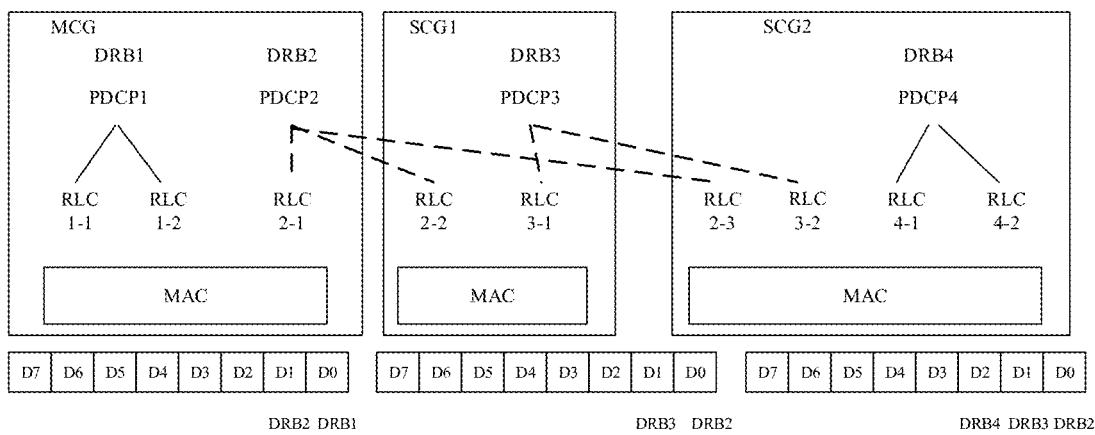
FIG. 4 is a schematic diagram of a mapping relationship between a DRB configured with duplication transmission and a cell group of Embodiment 2 of this disclosure.

FIG. 4 is a schematic diagram of a mapping relationship between a DRB configured with duplication transmission and a cell group of Embodiment 2 of this disclosure. As shown in FIG. 4, the user equipment and a master cell group (MCG), a first secondary cell group (SCG1) and a second secondary cell group (SCG2) form multiple connectivities. The user equipment has a first MAC entity corresponding to the MCG, a second MAC entity corresponding to the SCG1 and a third MAC entity corresponding to the SCG2. DRBs related to the first MAC entity are DRB1 and DRB2, DRBs related to the second MAC entity are DRB2 and DRB3, and DRBs related to the third MAC entity are DRB2, DRB3 and DRB4. Solid lines under each PDCP entity in FIG. 4 denote duplication transmissions in a carrier aggregation mode, and dotted lines denote duplication transmissions using at least two cell groups.

As shown in FIG. 4, DRB1 uses the carrier aggregation mode in MCG, and uses RLC1-1 and RLC1-2 to perform duplication transmission; DRB2 uses the MGB, SCG1 and SCG2 to perform duplication transmission, and uses RLC2-1, RLC2-2 and RLC2-3 to perform duplication transmission; DRB3 uses SCG1 and SCG2 to perform duplication transmission, and uses RLC3-1 and RLC3-2 to perform duplication transmission; and DRB4 uses the carrier aggregation mode in SCG2, and uses RLC4-1 and RLC4-2 to perform duplication transmission.

In this embodiment, for the case where the second configuration message includes at least one of the network device identifier, cell group identifier, RLC entity identifier and logical channel identifier used by at least one DRB for duplication transmission, for example, as to the mapping relationship shown in FIG. 4, the cell group ID, RLC entity ID and logical channel ID used for duplication transmission configured for DRB1 are {(MCG, RLC1-1, LCH1-1), (MCG, RLC1-2, LCH1-2)}, the cell group ID, RLC entity ID and logical channel ID used for duplication transmission configured for DRB2 are {(MCG, RLC2-1, LCH2-1), (SCG1, RLC2-2, LCH2-2), (SCG2, RLC2-3, LCH2-3)}, the cell group ID, RLC entity ID and logical channel ID used for duplication transmission configured for DRB3 are {(SCG1, RLC3-1, LCH3-1), (SCG2, RLC3-2, LCH3-2)}, and the cell group ID, RLC entity ID and logical channel ID used for duplication transmission configured for DRB4 are {(SCG2, RLC4-1, LCH4-1), (SCG2, RLC4-2, LCH4-2)}.

In this embodiment, for the case where the second configuration message includes at least one of the network device identifier, cell group identifier, RLC entity identifier and logical channel identifier used by at least one DRB for duplication transmission, for another example, for each DRB, it may be configured with at least two pieces of cell group information and/or RLC entity information and/or logical channel information used for performing multi-connectivity operations. For example, the cell group information may be a cell group identifier or index, the RLC entity information may be an identifier or index of an RLC entity, and the logical channel information may be a logical channel identifier or index. In addition, for each DRB, 1 bit is used to indicate whether the at least two pieces of cell group information and/or RLC entity information and/or logical channel information used in multi-connectivity operations may be used for duplication transmission of the DRB; or 1 bit is used, and when the bit is true, it indicates that the at least two pieces of cell group information and/or RLC entity information and/or logical channel information used in multi-connectivity operations may be used for duplication transmission of the DRB.

In this embodiment, for a DRB, when at least two network device identifier or at least two cell group identifier used for duplication transmission configured for the DRB are identical, it indicates that the DRB uses a carrier aggregation mode for performing duplication transmission.

For example, for the above example, when the cell group identifiers used for duplication transmission configured for DRB1 are all MCG, it indicates that DRB1 uses the carrier aggregation mode for duplication transmission of data in the MCG; and if the cell group identifiers used for duplication transmission configured for DRB4 are all SCG2, it indicates that DRB4 uses the carrier aggregation mode for performing duplication transmission of data in SCG2.

In this embodiment, for the case where the second configuration message includes information on whether at least one network device or at least one cell group may be used for performing duplication transmission, the configuration is valid for all DRBs related to the network device or cell group. For example, for the mapping relationship shown in FIG. 4, for DRB1~DRB4, MCG, SCG1 and SCG2 may all be configured to be used for duplication transmission.

In this embodiment, for the case where the second configuration message includes the information on the DRB configured to use at least one network device or at least one cell group for performing duplication transmission, for example, as to the mapping relationship shown in FIG. 4, it may be configured for the MCG that DRB1 and DRB2 may use the MCG for performing duplication transmission, it may be configured for SCG1 that DRB2 and DRB3 may use SCG1 for performing duplication transmission, and it may be configured for SCG2 that DRB2, DRB3 and DRB4 may use SCG2 for performing duplication transmission.

In this way, with the configuration method for duplication transmission of this embodiment, according to channel statuses of the cell groups, the cell groups used for duplication transmission are configured by using RRC signaling. Each DRB may be configured respectively, or all DRBs may be configured, which may ensure that duplication transmission uses cell groups with similar or better channel quality, and is beneficial to significant improvement of reliability.

In this embodiment, for at least one DRB configured with duplication transmission, its duplication transmission mode may also be configured to be a carrier aggregation mode or a mode in which at least two network devices or at least two cell groups are used for duplication transmission. For example, a parameter is added to the configuration of the DRB, a value of 0 indicating that its duplication transmission mode is carrier aggregation mode, and a value of 1 indicating that its duplication transmission mode is performing duplication transmission by using at least two network devices or at least two cell groups. Or, two parameters, denoted by parameter 1 and parameter 2, are added to the configuration of the DRB, when a value of parameter 1 is true, it indicates that the duplication transmission mode of the DRB is a carrier aggregation mode, and when a value of parameter 2 is true, it indicates that the duplication transmission mode of the DRB is a mode in which at least two network devices or at least two cell groups are used for duplication transmission.

After step 302, an activation/deactivation signalling for duplication transmission may also be transmitted to the user equipment to activate/deactivate the duplication transmission of the DRB.

For example, as shown in FIG. 4, an activation status of the duplication transmission is indicated by the MAC CE used for the activation/deactivation of the duplication transmission. The first MAC entity receives the MAC CE corresponding to the MCG, the second MAC entity receives the MAC CE corresponding to the SCG, and the third MAC entity receives the MAC CE corresponding to the MCG.

For example, each MAC CE is composed of 8 bits, which are D7~D0 from left to right. i in Di denotes a DRB configured with duplication transmission and related to the MAC entity, and its DRB ID is i, Di denotes the activation status of the duplication transmission of the DRB, and the activation statuses of the duplication transmission of the DRBs are arranged in a descending order or ascending order of indices of the DRBs. Taking that the first MAC entity receives the MAC CE corresponding to the MCG an example, as shown in FIG. 4, DRBs related to the first MAC entity are DRB1 and DRB2, an activation status of duplication transmission of DRB1 being denoted by D0, and an activation status of duplication transmission of DRB2 being denoted by D1, as there are only two DRBs configured for duplication transmission and related to the MAC entity, D2~D7 are set to 0. When D0 is 1, it indicates that the duplication transmission of DRB1 is activated, when D0 is 0, it indicates that the duplication transmission of DRB1 is deactivated, when D1 is 1, it indicates that the duplication transmission of DRB2 is activated, and when D1 is 0, it indicates that the duplication transmission of DRB2 is deactivated.

In addition, the configuration method of this embodiment may also be combined with a method for transmitting activation/deactivation signallings in Embodiment 1 and the following Embodiment 3 or Embodiment 4.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 3

The embodiment of this disclosure provides a configuration and/or activation method for duplication transmission, which further describes the activation method for duplication transmission in Embodiment 1, and is applicable to a network device side.

Figure 5:
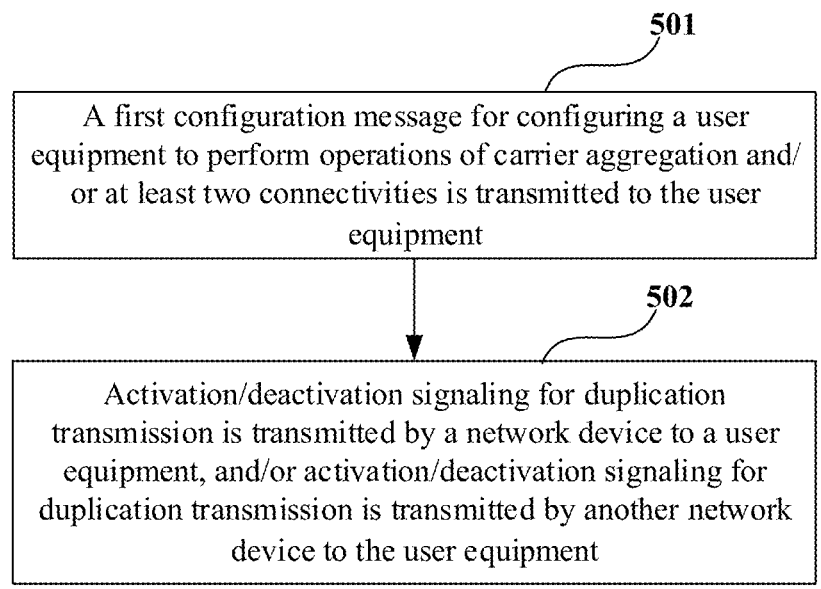
FIG. 5 is a schematic diagram of the configuration and/or activation method for duplication transmission of Embodiment 3 of this disclosure.

FIG. 5 is a schematic diagram of the configuration and/or activation method for duplication transmission of Embodiment 3 of this disclosure. As shown in FIG. 5, the method includes:

Step 501: a first configuration message for configuring a user equipment to perform operations of carrier aggregation and/or at least two connectivities is transmitted to the user equipment; and Step 502: activation/deactivation signaling for duplication transmission is transmitted by a network device to a user equipment, and/or activation/deactivation signaling for duplication transmission is transmitted by another network device to the user equipment.

In this embodiment, step 501 is identical to step 201 in Embodiment 1, and shall not be described herein any further.

Between step 501 and step 502, a step of transmitting a configuration message for duplication transmission to the user equipment may also be included. The configuration method may use the methods recorded in Embodiment 1 and Embodiment 2, which shall not be described herein any further.

In this embodiment, step 502 is further description of transmitting the activation/deactivation signaling for duplication transmission in step 202 in Embodiment 1.

In step 502, as to the activation/deactivation signaling for duplication transmission transmitted by the network device to the user equipment, the activation/deactivation signaling includes an indication of an activation status of duplication transmission of a DRB in the network device, and as to the activation/deactivation signaling for duplication transmission transmitted by another network device to the user equipment, the activation/deactivation signaling for duplication transmission includes an indication of an activation status of duplication transmission of a DRB in the other network device.

In this embodiment, the user equipment and the network device and the other network device are configured as at least two connectivities. In other words, at least two network devices configured as multiple connectivities respectively transmit activation/deactivation signaling for duplication transmission to the user equipment.

In step 502, the network device or other network devices may use a MAC CE or a PDCP control PDU to transmit the activation/deactivation signaling for duplication transmission.

Figure 6:
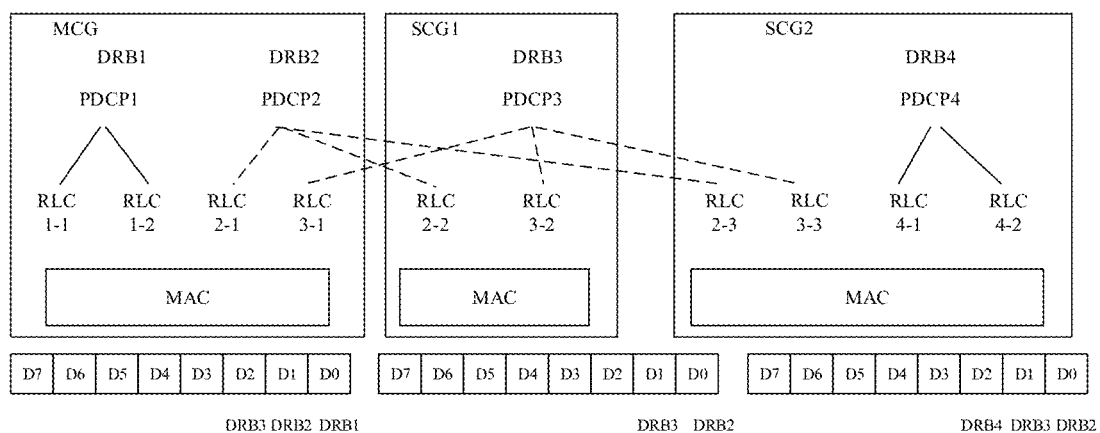
FIG. 6 is a schematic diagram of a mapping relationship between a DRB configured with duplication transmission and a cell group of Embodiment 3 of this disclosure.

FIG. 6 is a schematic diagram of a mapping relationship between a DRB configured with duplication transmission and a cell group of Embodiment 3 of this disclosure. As shown in FIG. 6, the user equipment and a master cell group (MCG), a first secondary cell group (SCG1) and a second secondary cell group (SCG2) form multiple connectivities. The user equipment has a first MAC entity corresponding to the MCG, a second MAC entity corresponding to SCG1 and a third MAC entity corresponding to SCG2. The first MAC entity receives a MAC CE transmitted by the MCG, the second MAC entity receives a MAC CE transmitted by the SCG, and the third MAC entity receives a MAC CE transmitted by the MCG. DRBs related to the first MAC entity and configured for duplication transmission are DRB1, DRB2 and DRB3, DRBs related to the second MAC entity and configured for duplication transmission are DRB2 and DRB3, and DRBs related to the third MAC entity and configured for duplication transmission are DRB2, DRB3 and DRB4. Solid lines under each PDCP entity in FIG. 6 denote duplication transmissions in a carrier aggregation mode, and dotted lines denote duplication transmissions using at least two cell groups.

For example, assuming that the MAC CE received by the first MAC entity is 00000010, in the first MAC entity, deactivation duplication transmission is for DRB1, activation duplication transmission is for DRB2, and deactivation duplication transmission is for DRB3;

assuming that the MAC CE received by the second MAC entity is 00000011, in the second MAC entity, activation duplication transmission is for DRB3, and activation duplication transmission is for DRB2;

assuming that the MAC CE received by the third MAC entity is 00000011, in the third MAC entity, deactivation duplication transmission is for DRB4, active duplication transmission is for DRB3, and activation duplication transmission is for DRB2.

Combining the above activation results, for DRB1, the user equipment deems that the duplication transmission in MCG (CA mode) is activated, for DRB2, the user equipment deems that the duplication transmission in MCG, SCG1 and SCG2 is activated, for DRB3, the user equipment deems that the duplication transmission in SCG1 and SCG2 is activated, and for DRB4, the user equipment deems that the duplication transmission in SCG2 is activated (CA mode).

In this way, performing the activation or deactivation of the duplication transmission of at least one DRB by the MAC CE is more dynamically flexible, which is adapted to rapid changes of channels and saves signaling overhead. In addition, respectively performing the activation or deactivation on each DRB is beneficial to performing corresponding operations according to requirements on quality of service (QoS) of different DRBs, so as to meet corresponding requirements on reliability or latency.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 4

The embodiment of this disclosure provides a configuration and/or activation method for duplication transmission, which further describes the activation method for duplication transmission in Embodiment 1, and is applicable to a network device side.

Figure 7:
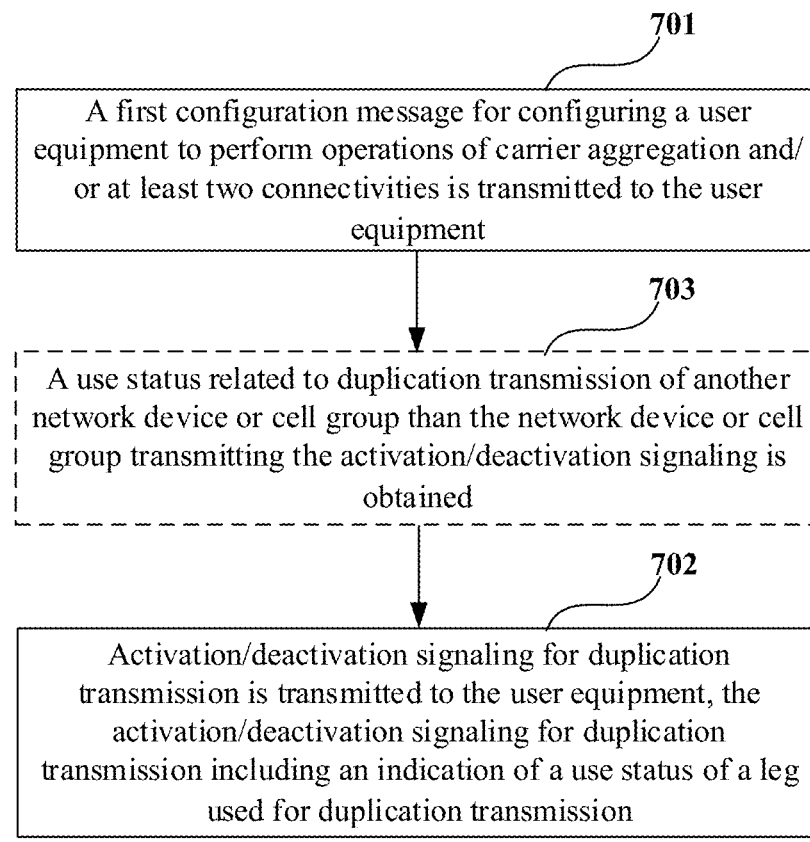
FIG. 7 is a schematic diagram of the configuration and/or activation method for duplication transmission of Embodiment 4 of this disclosure.

FIG. 7 is a schematic diagram of the configuration and/or activation method for duplication transmission of Embodiment 4 of this disclosure. As shown in FIG. 7, the method includes:

Step 701: a first configuration message for configuring a user equipment to perform operations of carrier aggregation and/or at least two connectivities is transmitted to the user equipment; and Step 702: activation/deactivation signaling for duplication transmission is transmitted to the user equipment, the activation/deactivation signaling for duplication transmission including an indication of a use status of a leg used for duplication transmission.

In this embodiment, step 701 is identical to step 201 in Embodiment 1, and shall not be described herein any further.

Between step 701 and step 702, a step of transmitting a configuration message for duplication transmission to the user equipment may also be included. The configuration method may use the methods recorded in Embodiment 1 and Embodiment 2, which shall not be described herein any further.

In this embodiment, step 702 is further description of transmitting the activation/deactivation signaling for duplication transmission in step 202 in Embodiment 1.

In step 702, the activation/deactivation signaling for duplication transmission is transmitted to the user equipment, the activation/deactivation signaling for duplication transmission including the indication of a use status of a leg used for duplication transmission, wherein the activation/deactivation signaling for duplication transmission is transmitted via a MAC CE or a PDCP control PDU.

In this embodiment, the indication of the use status of the leg for duplication transmission may be composed of a predetermined number of multiple bits. For example, the indication of the use status of the leg used for duplication transmission may consist of 8 bits.

In this embodiment, the leg may include at least one of a network device, a cell group, an MAC entity, an RLC entity and a logical channel.

In this embodiment, the indication on a use status of a leg used for the duplication transmission may include: a use status of a network device, or a cell group, or an MAC entity, or an RLC entity or a logic channel corresponding to an index or an identifier of the network device, or the cell group, or the MAC entity, or the RLC entity or the logic channel.

Figure 8:
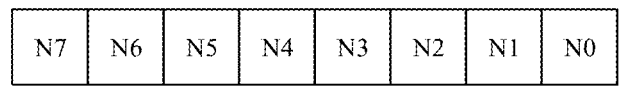
FIG. 8 is a schematic diagram of an indication of a use status of a leg used for duplication transmission of Embodiment 4 of this disclosure.

FIG. 8 is a schematic diagram of the indication of a use status of a leg used for duplication transmission of Embodiment 4 of this disclosure. As shown in FIG. 8, the indication consists of N7~N0; i in Ni denotes an index of the leg, and Ni denotes the use status of the leg. Use statuses of legs are arranged in descending or ascending order of their indices; when Ni is 1, it indicates that the leg is valid, that is, a leg with an index i is used for performing duplication transmission, and when Ni is 0, it indicates that the leg is invalid, that is, a leg with an index i is not used for performing duplication transmission.

Figure 9:
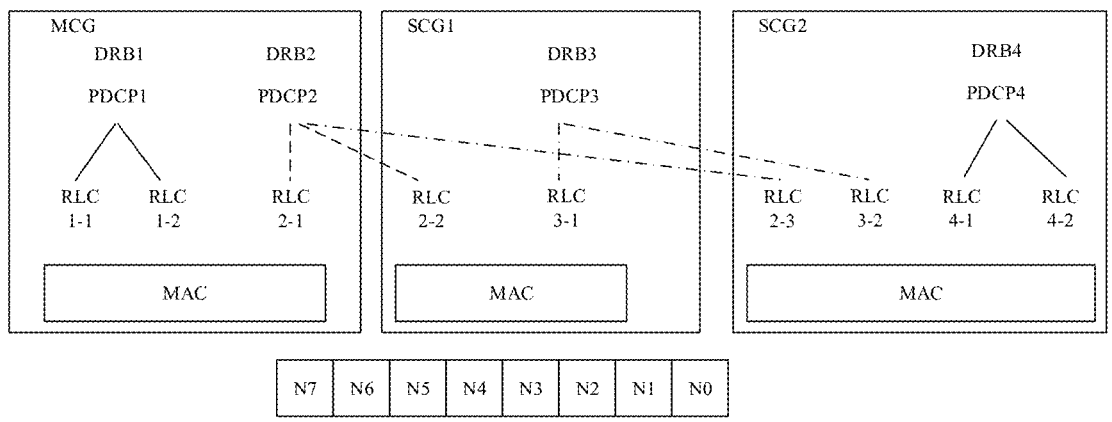
FIG. 9 is a schematic diagram of a mapping relationship between a DRB configured with duplication transmission and a cell group of Embodiment 4 of this disclosure.

FIG. 9 is a schematic diagram of a mapping relationship between a DRB configured with duplication transmission and a cell group of Embodiment 4 of this disclosure. As shown in FIG. 9, the user equipment and a master cell group (MCG), a first secondary cell group (SCG1) and a second secondary cell group (SCG2) form multiple connectivities. Solid lines under each PDCP entity in FIG. 9 denote duplication transmissions in a carrier aggregation mode, dotted lines denote duplication transmissions using at least two cell groups, and dash-dotted lines denote split transmission or transmission in a current cell group only.

For example, as shown in FIG. 8 and FIG. 9, N2 denotes a use status of MCG, N1 denotes a use status of SCG1, and N0 denotes a use status of SCG2, and the indication is 00000110, which indicates that the MCG for duplication transmission is valid, that is, the MCG is used for duplication transmission, and SCG1 used for duplication transmission is valid, that is, SCG1 is used for duplication transmission, and SCG2 used for duplication transmission is invalid, that is, SCG2 is not used for duplication transmission.

In this embodiment, for all DRBs that are currently configured for split transmission and/or duplication transmission, when the use status is valid, it indicates that the DRBs use the network device or cell group or MAC entity or RLC entity or logical channel to perform duplication transmission; and when the use status is invalid, it indicates that the DRBs do not use the network device or cell group or MAC entity or RLC entity or logical channel to perform duplication transmission.

In addition, for a DRB, for a leg that is not configured for split transmission of the DRB, the indication on using the leg for performing duplication transmission is ignored.

For example, as shown in FIG. 8 and FIG. 9, for DRBs (i.e. DRB2 and DRB3) configured as being in the split transmission mode, they all use the RLC entity in the MCG for duplication transmission and all use the RLC entity in SCG1 for duplication transmission, all do not use the RLC entity in SCG2 for duplication transmission; thus, MCG and SCG1 are used for duplication transmission for DRB2. In addition, as a leg with an MCG of split transmission is not configured for DRB3, an indication on using the MCG for performing duplication transmission for DRB3 is ignored, hence, only SCG1 is only used for transmission.

In this way, information on used legs may be simultaneously indicated to DRBs having similar requirements on QoS, and these DRBs may operate separately without transmitting current activation/deactivation for duplication transmission, thereby saving signaling overhead.

In this embodiment, the method may further include:

Step 703: a use status related to duplication transmission of another network device or cell group than the network device or cell group transmitting the activation/deactivation signaling is obtained.

In this embodiment, the user equipment and the network device or cell group and other network devices or cell groups are configured as at least two connectivities.

For example, the MCG transmits the activation/deactivation signaling to the user equipment, and before the activation/deactivation signaling is transmitted, the MCG obtains respective use statuses related to duplication transmission from SCG1 and SCG2, that is, whether SCG1 and SCG2 are used for duplication transmission of DRB1~DRB4.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 5

The embodiment of this disclosure provides a configuration and/or activation method for duplication transmission, which further describes the configuration and activation method for duplication transmission in Embodiment 1, and is applicable to a network device side.

Figures 10, 11:
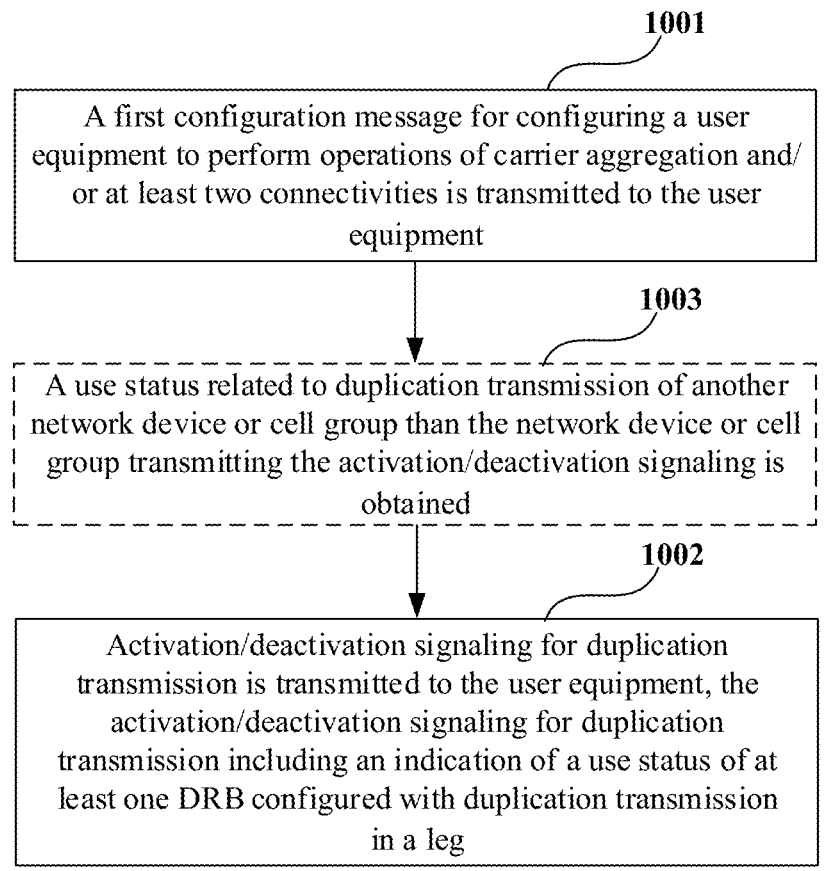
FIG. 10 is a schematic diagram of the configuration and/or activation method for duplication transmission of Embodiment 5 of this disclosure.
FIG. 11 is a schematic diagram of activation/deactivation signaling of Embodiment 5 of this disclosure.

FIG. 10 is a schematic diagram of the configuration and/or activation method for duplication transmission of Embodiment 5 of this disclosure. As shown in FIG. 10, the method includes:

Step 1001: a first configuration message for configuring a user equipment to perform operations of carrier aggregation and/or at least two connectivities is transmitted to the user equipment; and Step 1002: activation/deactivation signaling for duplication transmission is transmitted to the user equipment, the activation/deactivation signaling for duplication transmission including an indication of use statuses of legs of at least one DRB configured with duplication transmission.

In this embodiment, step 1001 is identical to step 201 in Embodiment 1, and shall not be described herein any further.

In step 1002, the activation/deactivation signaling may be dynamically transmitted to the user equipment. For example, the activation/deactivation signaling is transmitted dynamically according to changes in channel quality.

In this embodiment, the activation/deactivation signaling may be transmitted via a MAC CE or a PDCP control PDU.

In this embodiment, the activation/deactivation signaling may further include a mapping relationship between at least one DRB configured with duplication transmission and a leg.

In this embodiment, the indication of the use status may include: a use status of at least one DRB configured with duplication transmission in at least one leg.

In this embodiment, the leg may include at least one of a network device, a cell group, an MAC entity, an RLC entity and a logical channel. When the use status is valid, it indicates that the network device or cell group or MAC entity or RLC entity or logical channel is used for performing duplication transmission; and when the use status is invalid, it indicates that the network device or cell group or MAC entity or RLC entity or logical channel is not used for performing duplication transmission.

In this embodiment, the activation/deactivation signaling may be composed of multiple bit sequences corresponding to the number of DRBs configured for duplication transmission. For example, the activation/deactivation signaling may be composed of 4×4 bits, and there are a total of 4 DRBs configured for duplication transmission, each 4-bit sequence denoting indication of use statuses of legs of a DRB.

FIG. 11 is a schematic diagram of activation/deactivation signaling of Embodiment 5 of this disclosure. As shown in FIG. 11, the activation/deactivation signaling consists of 4×4 bits. Four 4-bit sequences denote indications of use statuses of DRB1~DRB4 in the leg in turn. Each 4-bit sequence is denoted by N3~N0; i in Ni denotes an index of the leg, Ni denotes the use status of the leg, and the use statuses of the legs are arranged in a descending or ascending order of their indices. For a DRB, when Ni is 1, it indicates that the leg is valid, that is, the DRB uses the leg with an index i for performing duplication transmission, and when Ni is 0, it indicates that the leg is invalid, that is, the DRB does not use the leg with an index i for performing duplication transmission.

For example, N2 denotes a use status of MCG, N1 denotes a use status of SCG1, and N0 denotes a use status of SCG2. Assuming that the activation/deactivation signaling is 0100 0111 0111 0001, it indicates that DRB1 uses the MCG for performing duplication transmission, DRB2 uses MCG, SCG1 and SCG2 for performing duplication transmission, DRB3 uses MCG, SCG1 and SCG2 for performing duplication transmission, and DRB4 uses SCG2 for performing duplication transmission.

For DRB1, it performs duplication transmission in a cell group MCG, indicating that its duplication transmission mode is a carrier aggregation mode, and all RLC entities and/or logical channels in the MCG are activated, and when the duplication transmission is deactivated, that is, when the use status of the MCG is invalid, only a master RLC entity and/or a master logical channel in the MCG is/are reserved, and other RLC entities and/or logical channels are all deactivated. Likewise, DRB4 performs duplication transmission in the carrier aggregation mode in SCG2, and all RLC entities and/or logical channels in SCG2 are activated, and when the duplication transmission is deactivated, that is, the use status of SCG2 is invalid, only a master RLC entity and/or a master logical channel in SCG2 are retained, and other RLC entities and/or logical channels are all deactivated.

In this way, information on a used node/cell group is dynamically indicated to each DRB, which is adapted to dynamic channel quality changes, and signaling overhead is not large.

In this embodiment, the method may further include:

Step 1003: a use status related to duplication transmission of another network device or cell group than the network device or cell group transmitting the activation/deactivation signaling is obtained.

In this embodiment, the user equipment and the network device and other network devices are configured as at least two connectivities.

For example, the MCG transmits the activation/deactivation signaling to the user equipment, and before transmitting the activation/deactivation signaling, the MCG obtains use statuses related to respective duplication transmission from SCG1 and SCG2, that is, whether SCG1 and SCG2 are used for duplication transmission of DRB1~DRB4.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 6

The embodiment of this disclosure provides a method for duplication transmission, which is applicable to a user equipment side, and corresponds to the configuration and/or activation method for duplication transmission in Embodiment 1 applicable to the network device side.

Figure 12:
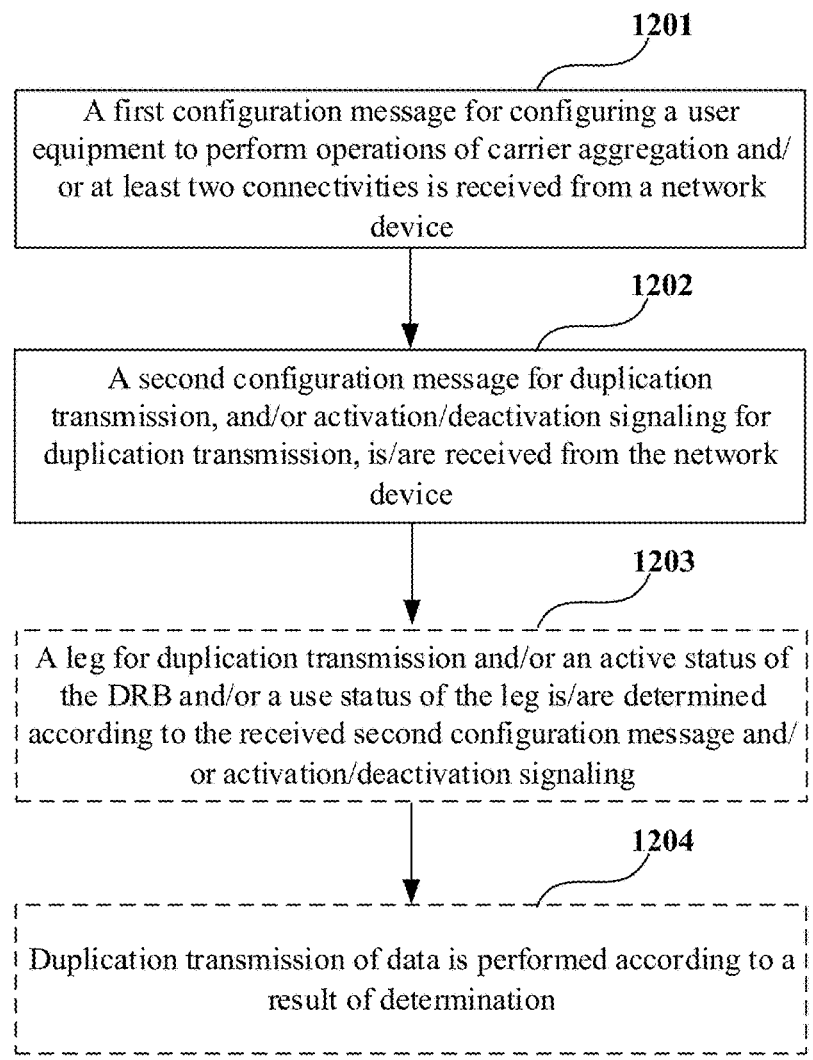
FIG. 12 is a schematic diagram of the method for duplication transmission of Embodiment 6 of this disclosure.

FIG. 12 is a schematic diagram of the method for duplication transmission of Embodiment 6 of this disclosure. As shown in FIG. 12, the method includes:

Step 1201: a first configuration message for configuring a user equipment to perform operations of carrier aggregation and/or at least two connectivities is received from a network device; and Step 1202: a second configuration message for duplication transmission, and/or activation/deactivation signaling for duplication transmission, is/are received from the network device.

Thus, the configuration message used for duplication transmission and/or the activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

In this embodiment, contents of the first configuration message, second configuration message and activation/deactivation signaling may be identical those contained in embodiments 1-5, and shall not be described herein any further.

In this embodiment, "carrier aggregation" refers to aggregating multiple component carriers together, each carrier having a serving cell configured for the user equipment to achieve a larger transmission bandwidth.

In this embodiment, "at least two connectivities" is also referred to as multiple connectivities (MC), which includes dual connectivity (DC) and three or more connectivities. In other words, a user equipment configured with at least two connectivities is connected to at least two network devices or cell groups. For example, it is connected to three or more network devices or cell groups.

In this embodiment, "a leg" may include at least one of the following: a network device, a node, a cell group, an MAC entity, and an RLC entity and/or logical channel related to at least one of the network device, the node, the cell group and the MAC entity.

For example, when the mode of carrier aggregation is used for performing duplication transmission, the leg may be an RLC entity and/or a logical channel; and when the mode of "at least two connectivities" is used for performing duplication transmission, the leg may be at least one of a network device, a node, a cell group and an MAC entity, and/or an RLC entity and/or a logical channel of the network device/the node/the cell group/the MAC entity.

In this embodiment, the second configuration message may be configuring at least one DRB of the user equipment with whether the DRB supports duplication transmission.

In this embodiment, an signalling for duplication activation/deactivation may be an indication for duplication activation and/or deactivation.

In this embodiment, the activation of duplication transmission may be that at least one DRB related to the MAC entity uses different legs to transmit identical data, and the deactivation of duplication transmission means that the DRB does not use a leg to transmit data, or uses a single leg to transmit data, or uses different legs to transmit different data, that is, using a split transmission mode.

In step 1202, only the second configuration message for duplication transmission may be received, or only the activation/deactivation signaling for duplication transmission may be received, or the second configuration message for duplication transmission and the activation/deactivation signaling for duplication transmission may be received.

In this embodiment, the first configuration message and the second configuration message may be the same message. In other words, information in the first configuration message and information in the second configuration message may be contained in the same message (such as an RRC reconfiguration message, or an RRC resume message, etc.). For example, the network device transmits a configuration message containing the information in the first configuration message and the information in the second configuration message to the user equipment, in which case reception of the first configuration message in step 1201 and reception of the second configuration message in step 1202 are performed in a combined manner.

In this embodiment, the network device transmitting the first configuration message to the user equipment and the network device transmitting the second configuration message and/or the activation/deactivation signaling to the user equipment may be the same network device, or may be different network devices, which is not limited in the embodiment of this disclosure.

In this embodiment, the method may further include:

Step 1203: a leg for duplication transmission and/or an activation status of the DRB and/or a use status of the leg is/are determined according to the received second configuration message and/or activation/deactivation signaling; and Step 1204: duplication transmission of data is performed according to a result of determination.

In this embodiment, step 1203 may be executed by the MAC entity of the user equipment, the MAC entity forwards the result of determination to a PDCP entity of a related DRB, and the PDCP entity performs duplication transmission of data in step 1204.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 7

The embodiment of this disclosure provides a method for duplication transmission. This method further describes the receiving the second configuration message in Embodiment 6, corresponds to Embodiment 2, and is applicable to a user equipment side. Reference may be made to Embodiment 2 for specific implementation of this method, and repeated parts thereof shall not be described herein any further.

Figure 13:
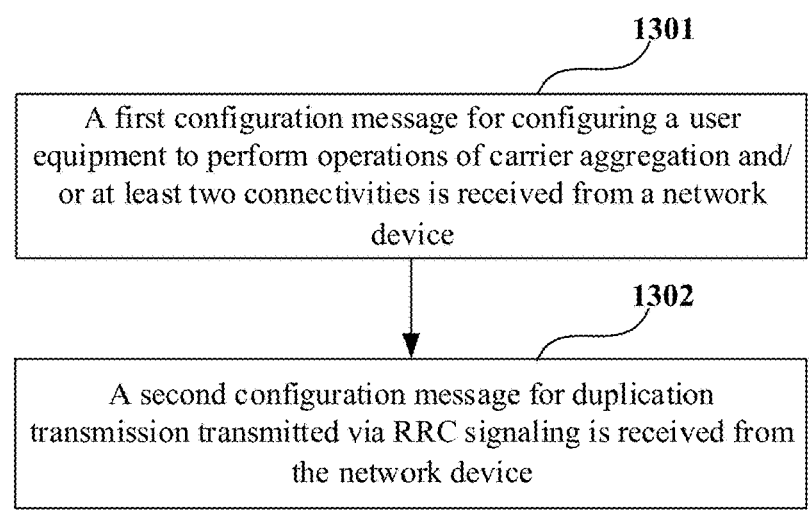
FIG. 13 is a schematic diagram of the method for duplication transmission of Embodiment 7 of this disclosure.

FIG. 13 is a schematic diagram of the method for duplication transmission of Embodiment 7 of this disclosure. As shown in FIG. 13, the method includes:

Step 1301: a first configuration message for configuring a user equipment to perform operations of carrier aggregation and/or at least two connectivities is received from a network device; and Step 1302: a second configuration message for duplication transmission transmitted via RRC signaling is received from the network device.

In this embodiment, the second configuration message received from the network device may include at least one piece of the following information: information on a leg used by at least one data radio bearer (DRB) in performing duplication transmission; information on whether at least one leg is able to be used for duplication transmission; and information on a DRB using at least one leg configured to be used for duplication transmission.

In this embodiment, the information on a leg used by at least one data radio bearer (DRB) in performing duplication transmission may include at least one of the following: a network device identifier, a cell group identifier, a radio link control (RLC) entity identifier and a logic channel identifier used by the at least one DRB in performing duplication transmission; the information on whether at least one leg is able to be used for duplication transmission may include: information on whether at least one network device or at least one cell group is able to be used for duplication transmission; and the information on a DRB using at least one leg configured to be used for duplication transmission may include: information on a DRB using at least one network device or cell group configured to be used for duplication transmission, such as an identifier or index of the DRB.

In this embodiment, for a DRB, when at least two network device identifiers or at least two cell group identifiers used for duplication transmission configured for the DRB are identical, it indicates that the DRB uses a carrier aggregation (CA) mode for performing duplication transmission.

In this embodiment, for at least one DRB configured with duplication transmission, its duplication transmission mode is configured as a carrier aggregation (CA) mode or a mode in which at least two cell groups are used for duplication transmission.

In this embodiment, reference may be made to the description of FIG. 4 in Embodiment 2 for particular actions of the user equipment after receiving the second configuration message, which shall not be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 8

The embodiment of this disclosure provides a method for duplication transmission. This method further describes the receiving the activation/deactivation signaling in Embodiment 6, corresponds to Embodiment 3, and is applicable to a user equipment side. Reference may be made to Embodiment 3 for specific implementation of this method, and repeated parts thereof shall not be described herein any further.

Figure 14:
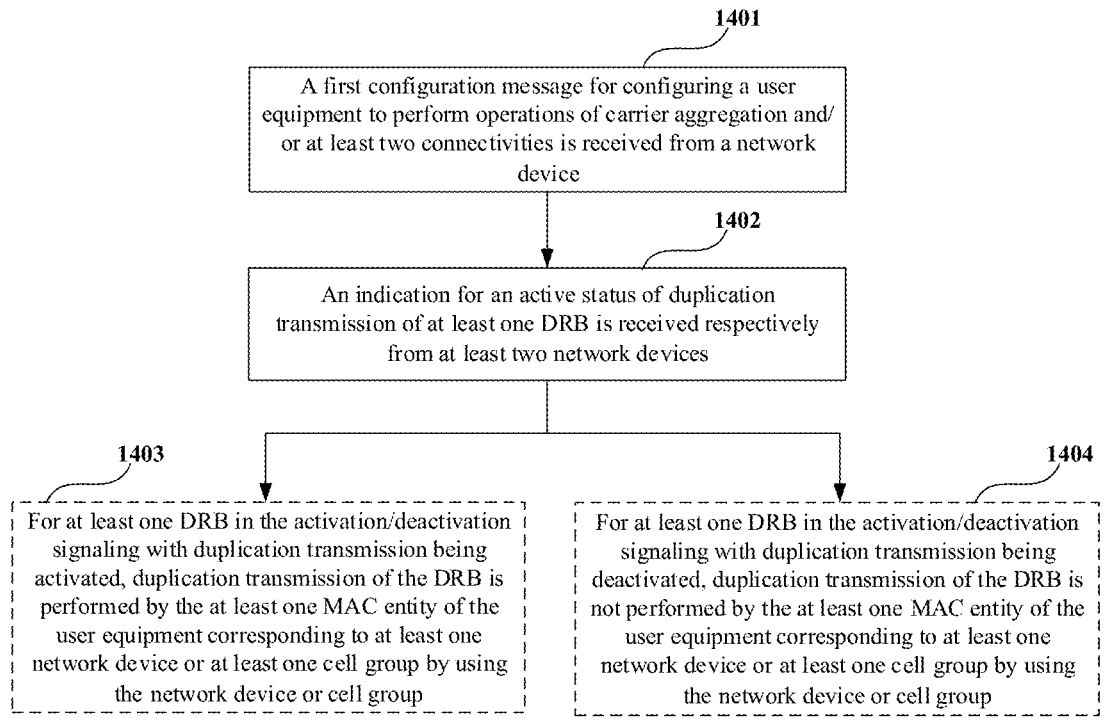
FIG. 14 is a schematic diagram of the method for duplication transmission of Embodiment 8 of this disclosure.

FIG. 14 is a schematic diagram of the method for duplication transmission of Embodiment 8 of this disclosure. As shown in FIG. 14, the method includes:

Step 1401: a first configuration message for configuring a user equipment to perform operations of carrier aggregation and/or at least two connectivities is received from a network device; and Step 1402: an indication for an activation status of duplication transmission of at least one DRB is received respectively from at least two network devices.

In this embodiment, the user equipment and the at least two network devices are configured as at least two connectivities.

In this embodiment, step 1401 is identical to step 1201 in Embodiment 6, and shall not be described herein any further.

In this embodiment, between step 1401 and step 1402, a step of receiving a configuration message for duplication transmission from the network device may also be included. The configuration message may be the second configuration message in embodiments 6 and 7, and shall not be described herein any further.

In this embodiment, at least one MAC entity of the user equipment corresponding to at least one network device or at least one cell group determines an activation status of duplication transmission of at least one DRB related to the MAC entity.

In this embodiment, the method may further include:

Step 1403: for at least one DRB in the activation/deactivation signaling with duplication transmission being activated, duplication transmission of the DRB is performed by the at least one MAC entity of the user equipment corresponding to at least one network device or at least one cell group by using the network device or cell group; and/or Step 1404: for at least one DRB in the activation/deactivation signaling with duplication transmission being deactivated, duplication transmission of the DRB is not performed by the at least one MAC entity of the user equipment corresponding to at least one network device or at least one cell group by using the network device or cell group.

In this embodiment, for the at least one DRB in the activation/deactivation signaling with duplication transmission being activated, the at least one MAC entity of the user equipment corresponding to at least one network device or at least one cell group performs duplication transmission of the DRB by using an RLC entity and/or logical channel related to the MAC entity configured for the DRB, and/or, for the at least one DRB in the activation/deactivation signaling with duplication transmission being deactivated, the at least one MAC entity of the user equipment corresponding to at least one network device or at least one cell group does not perform duplication transmission of the DRB by using an RLC entity and/or logical channel related to the MAC entity configured for the DRB.

In this embodiment, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

In this embodiment, reference may be made to the description of FIG. 6 in Embodiment 3 for particular actions of the user equipment after receiving the activation/deactivation signaling, which shall not be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 9

The embodiment of this disclosure provides a method for duplication transmission. This method further describes the receiving the activation/deactivation signaling in Embodiment 6, corresponds to Embodiment 4, and is applicable to a user equipment side. Reference may be made to Embodiment 4 for specific implementation of this method, and repeated parts thereof shall not be described herein any further.

Figure 15:
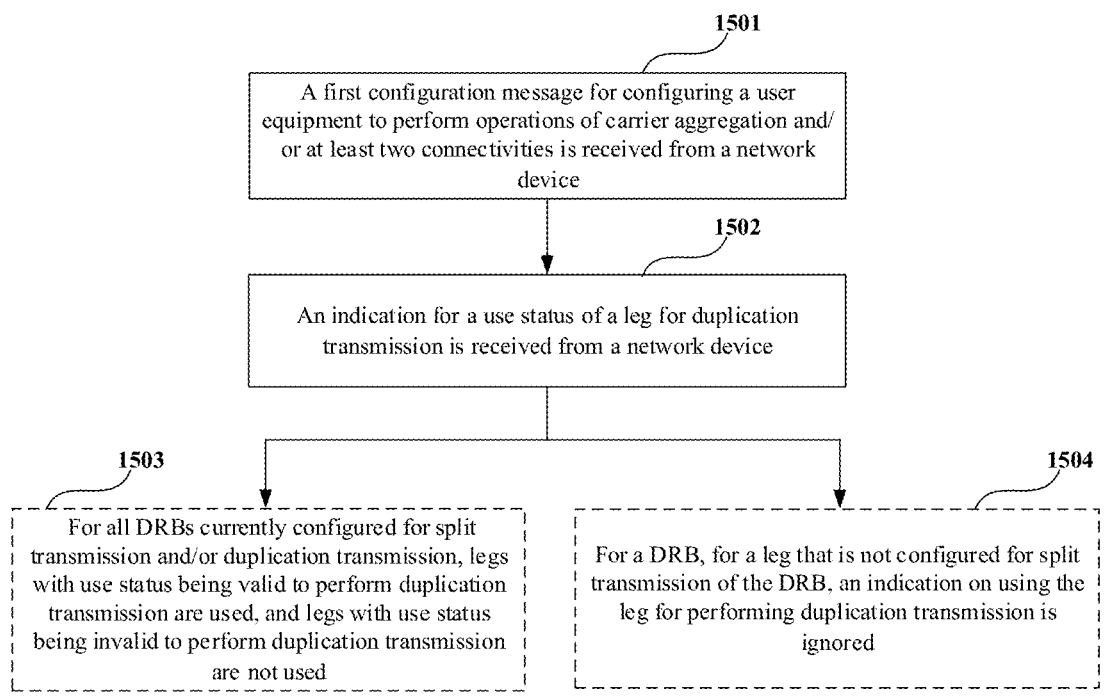
FIG. 15 is a schematic diagram of the method for duplication transmission of Embodiment 9 of this disclosure.

FIG. 15 is a schematic diagram of the method for duplication transmission of Embodiment 9 of this disclosure. As shown in FIG. 15, the method includes:

Step 1501: a first configuration message for configuring a user equipment to perform operations of carrier aggregation and/or at least two connectivities is received from a network device; and Step 1502: an indication for a use status of a leg for duplication transmission is received from a network device.

In this embodiment, step 1501 is identical to step 1201 in Embodiment 6, and shall not be described herein any further.

In this embodiment, between step 1501 and step 1502, a step of receiving a configuration message for duplication transmission from the network device may also be included. The configuration message may be the second configuration message in embodiments 6 and 7, and shall not be described herein any further.

In this embodiment, the method may further include:

Step 1503: for all DRBs currently configured for split transmission and/or duplication transmission, legs with use status being valid to perform duplication transmission are used, and legs with use status being invalid to perform duplication transmission are not used.

In this embodiment, the method may further include:

Step 1504: for a DRB, for a leg that is not configured for split transmission of the DRB, an indication on using the leg for performing duplication transmission is ignored.

In this embodiment, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

In this embodiment, reference may be made to the description of FIGS. 8 and 9 in Embodiment 4 for particular actions of the user equipment after receiving the activation/deactivation signaling, which shall not be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 10

The embodiment of this disclosure provides a method for duplication transmission. This method further describes the receiving the second configuration message and activation/deactivation signaling in Embodiment 6, corresponds to Embodiment 5, and is applicable to a user equipment side. Reference may be made to Embodiment 5 for specific implementation of this method, and repeated parts thereof shall not be described herein any further.

Figure 16:
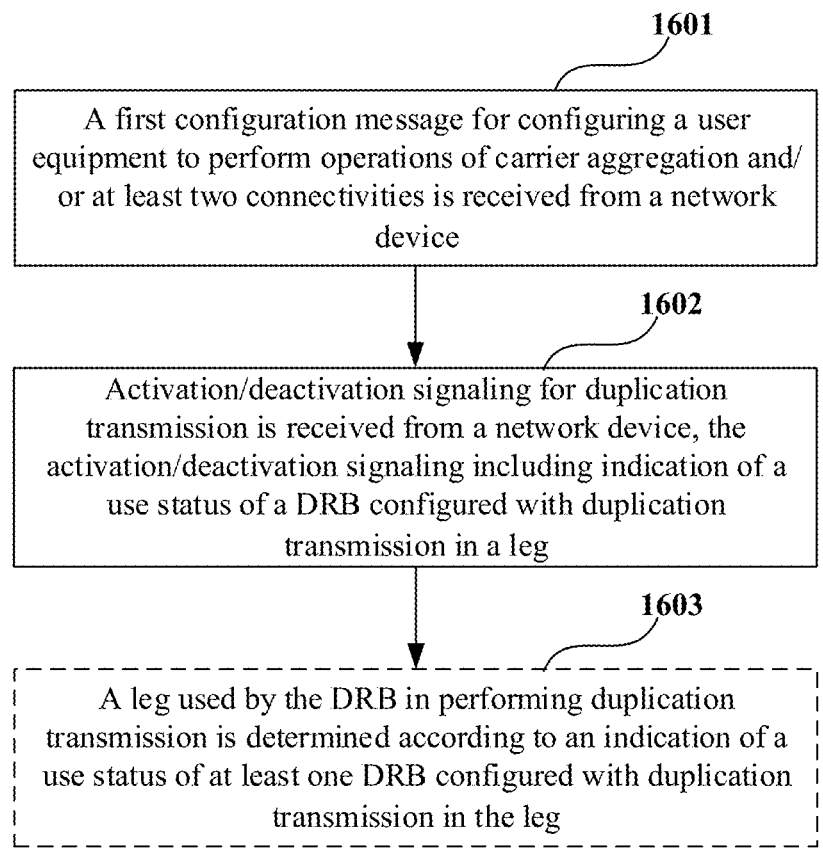
FIG. 16 is a schematic diagram of the method for duplication transmission of Embodiment 10 of this disclosure.

FIG. 16 is a schematic diagram of the method for duplication transmission of Embodiment 10 of this disclosure. As shown in FIG. 16, the method includes:

Step 1601: a first configuration message for configuring a user equipment to perform operations of carrier aggregation and/or at least two connectivities is received from a network device; and Step 1602: activation/deactivation signaling for duplication transmission is received from a network device, the activation/deactivation signaling including indication of use statuses of legs of a DRB configured with duplication transmission.

In this embodiment, the method may further include:

Step 1603: a leg used by the DRB in performing duplication transmission is determined according to an indication of a use status of at least one DRB configured with duplication transmission in the leg.

In this embodiment, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

In this embodiment, reference may be made to the description of FIG. 10 in Embodiment 5 for particular actions of the user equipment after receiving the activation/deactivation signaling, which shall not be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 11

The embodiment of this disclosure provides a method for duplication transmission. This method corresponds to embodiments 1-10, and is applicable to a network device side and a user equipment side. Reference may be made to embodiments 1-10 for specific implementation of this method, and repeated parts thereof shall not be described herein any further.

Figure 17:
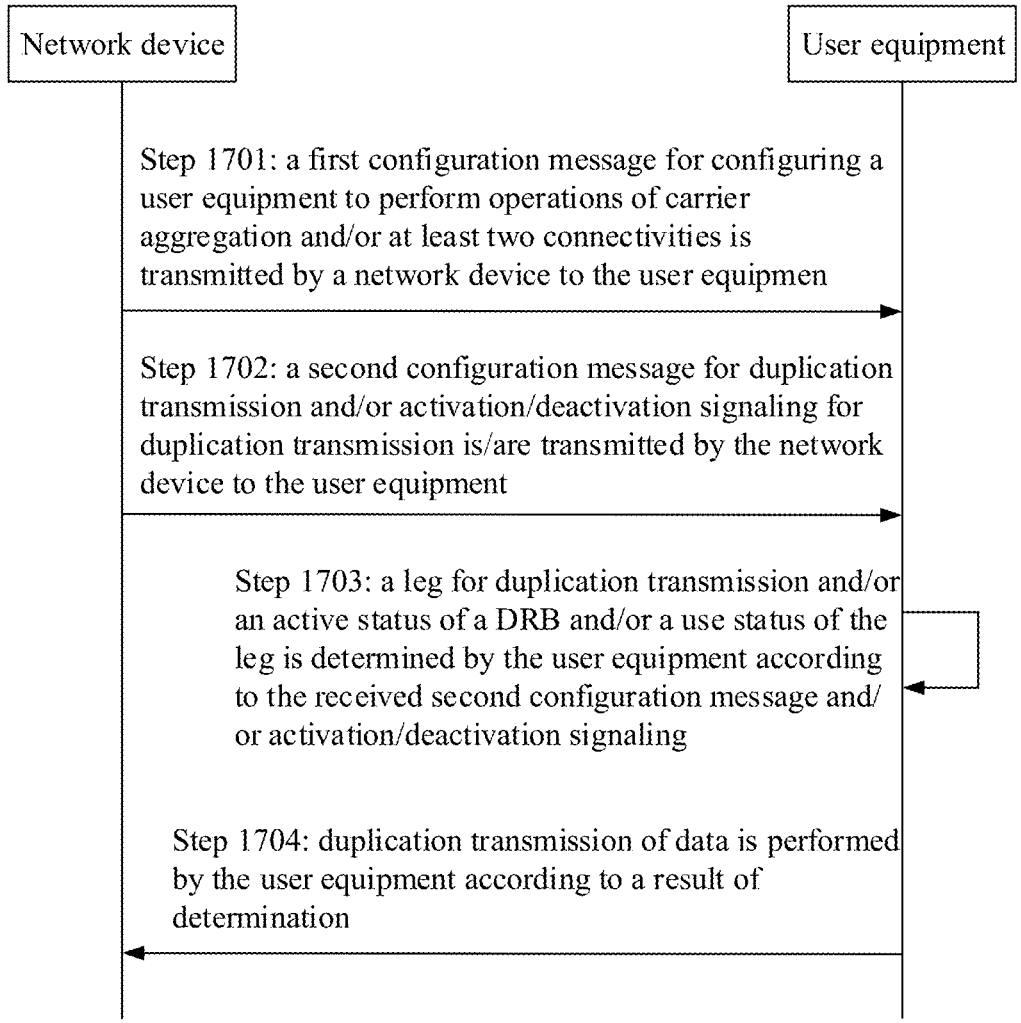
FIG. 17 is a schematic diagram of the method for duplication transmission of Embodiment 11 of this disclosure.

FIG. 17 is a schematic diagram of the method for duplication transmission of Embodiment 11 of this disclosure. As shown in FIG. 17, the method includes:

Step 1701: a first configuration message for configuring a user equipment to perform operations of carrier aggregation and/or at least two connectivities is transmitted by a network device to the user equipment;

Step 1702: a second configuration message for duplication transmission and/or activation/deactivation signaling for duplication transmission is/are transmitted by the network device to the user equipment;

Step 1703: a leg for duplication transmission and/or an activation status of a DRB and/or a use status of the leg is determined by the user equipment according to the received second configuration message and/or activation/deactivation signaling; and Step 1704: duplication transmission of data is performed by the user equipment according to a result of determination.

In this embodiment, reference may be made to what is contained in embodiments 1-5 for specific implementations of step 1701 and step 1702, and reference may be made to what is contained in Embodiment 6 for specific implementations of step 1703 and step 1704, which shall not be described herein any further.

Figure 18:
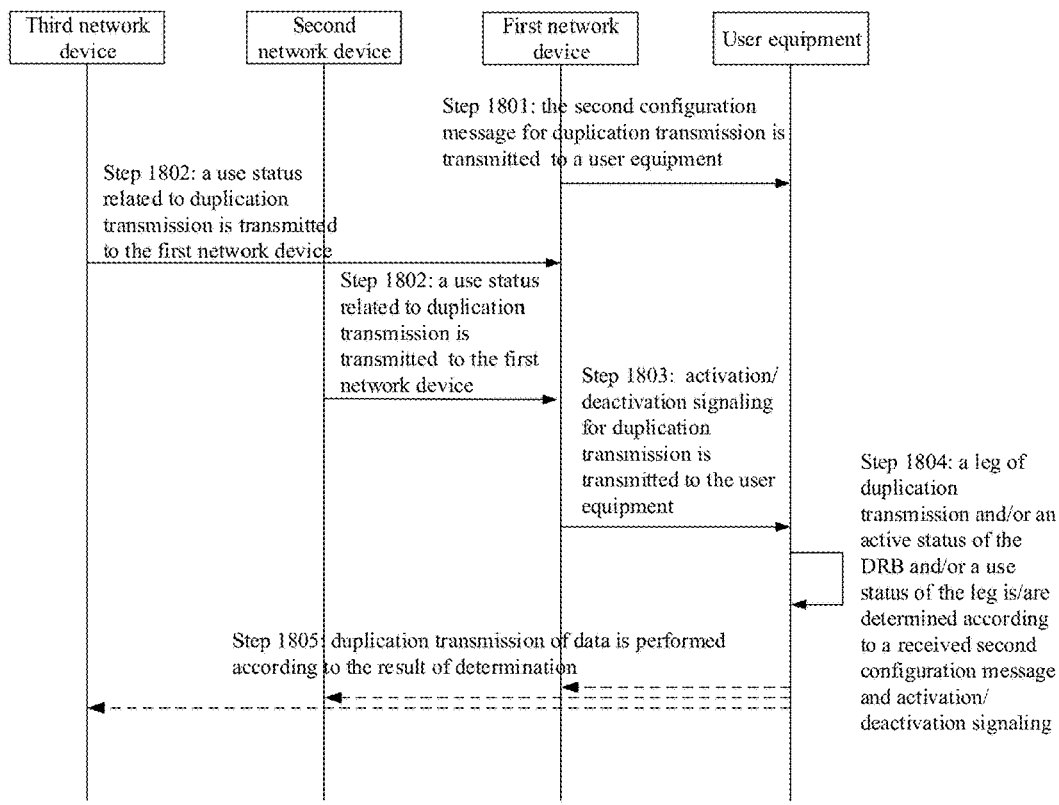
FIG. 18 is another schematic diagram of the method for duplication transmission of Embodiment 11 of this disclosure.

FIG. 18 is another schematic diagram of the method for duplication transmission of Embodiment 11 of this disclosure. As shown in FIG. 18, a user equipment and a first network device, a second network device and a third network device form multiple connectivities, and the method includes:

Step 1801: the second configuration message for duplication transmission is transmitted by the first network device to a user equipment;

Step 1802: a use status related to duplication transmission is transmitted by the second network device and the third network device respectively to the first network device;

Step 1803: activation/deactivation signaling for duplication transmission is transmitted by the first network device to the user equipment;

Step 1804: a leg of duplication transmission and/or an activation status of the DRB and/or a use status of the leg is/are determined by the user equipment according to a received second configuration message and activation/deactivation signaling;

Step 1805: duplication transmission of data is performed by the user equipment according to the result of determination.

In step 1802, the first network device pre-collects use statuses related to duplication transmission of other cell groups, to transmit the use statuses together with a use status related to duplication transmission of its own to the user equipment.

In this embodiment, the first network device is, for example, a master network device or a master cell group.

In this embodiment, reference may be made to what is contained in embodiments 1-5 for specific implementations of step 1801 and step 1803, and reference may be made to what is contained in Embodiment 6 for specific implementations of step 1804 and step 1805, which shall not be described herein any further.

Figure 19:
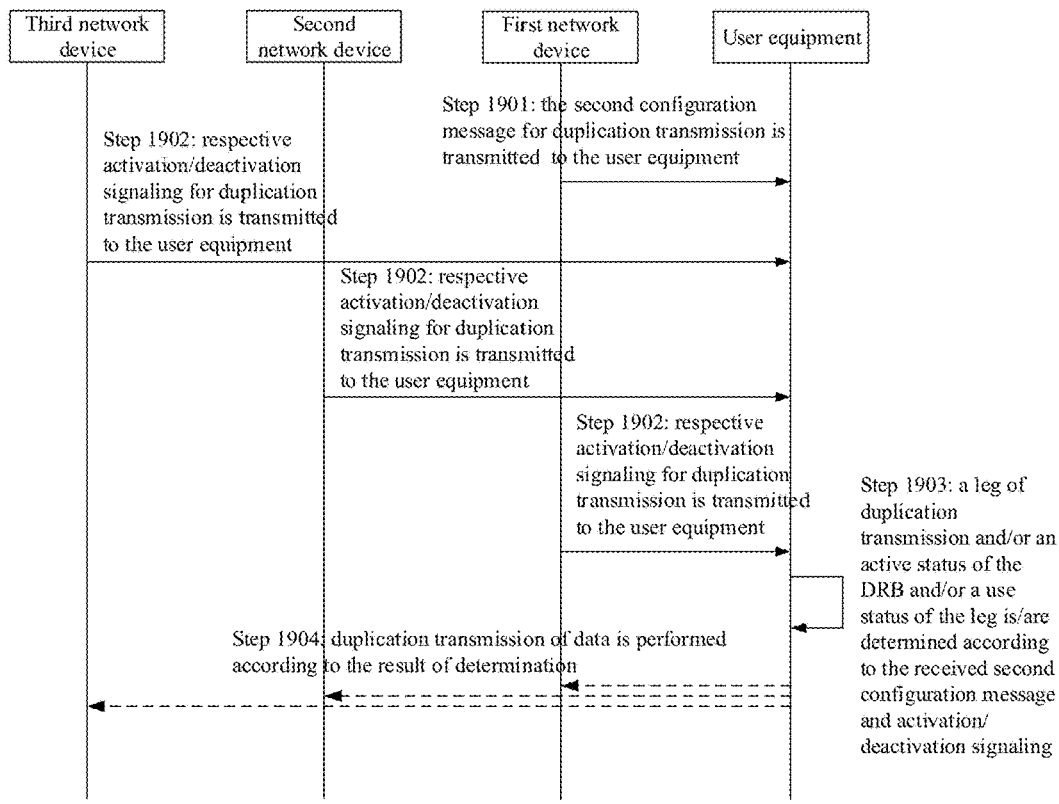
FIG. 19 is a further schematic diagram of the method for duplication transmission of Embodiment 11 of this disclosure.

FIG. 19 is a further schematic diagram of the method for duplication transmission of Embodiment 11 of this disclosure. As shown in FIG. 19, the user equipment and a first network device, a second network device and a third network device form multiple connectivities, and the method includes;

Step 1901: the second configuration message for duplication transmission is transmitted by the first network device to the user equipment;

Step 1902: respective activation/deactivation signaling for duplication transmission is transmitted by the first network device, the second network device and the third network device respectively to the user equipment;

Step 1903: a leg of duplication transmission and/or an activation status of the DRB and/or a use status of the leg by the user equipment is/are determined according to the received second configuration message and activation/deactivation signaling;

Step 1904: duplication transmission of data is performed by the user equipment according to the result of determination.

In this embodiment, the first network device is, for example, a master network device or a master cell group.

In this embodiment, reference may be made to what is contained in embodiments 1 and 2 for specific implementations of step 1901, reference may be made to what is contained in Embodiment 3 for specific implementations of step 1902, and reference may be made to what is contained in Embodiment 6 for specific implementations of step 1903 and step 1904, which shall not be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 12

The embodiment of this disclosure provides a method for duplication transmission, applicable to a user equipment side.

Figure 20:
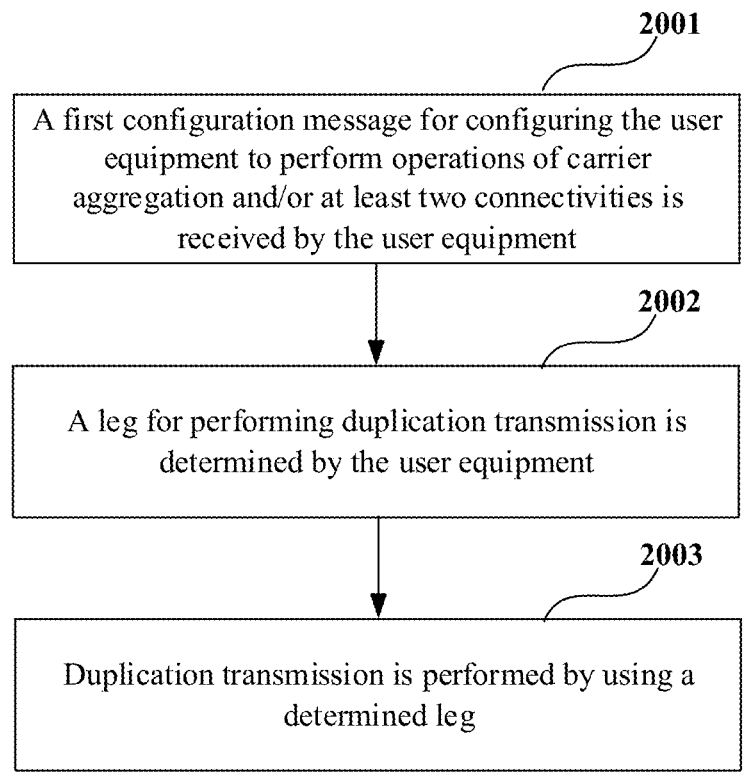
FIG. 20 is a schematic diagram of the method for duplication transmission of Embodiment 12 of this disclosure.

FIG. 20 is a schematic diagram of the method for duplication transmission of Embodiment 12 of this disclosure. As shown in FIG. 20, the method includes:

Step 2001: a first configuration message for configuring the user equipment to perform operations of carrier aggregation and/or at least two connectivities is received by the user equipment;

Step 2002: a leg for performing duplication transmission is determined by the user equipment.

In this embodiment, step 2001 is identical to what is contained in Embodiment 6, and shall not be described herein any further.

In step 2002, the user equipment may determine the leg for duplication transmission according to at least one of a transmission success rate, a downlink measurement result and an uplink measurement result.

For example, when the leg for duplication transmission is determined according to the transmission success rate, it may be determined based on feedback of a hybrid automatic repeat request (HARD) or feedback of an automatic repeat request (ARQ).

For example, in determining the leg for duplication transmission according to a downlink measurement result, it may be determined based on a measurement result of downlink radio resource management (RRM).

In this embodiment, the user equipment determines a leg for duplication transmission of at least one DRB configured with duplication transmission, that is, when there exist multiple DRBs, legs of the DRBs for performing duplication transmission are determined respectively for the DRB. And it may also be that the user equipment determines legs of all DRBs for performing duplication transmission.

In this embodiment, for example, a PDCP entity of the user equipment determines the leg.

In this embodiment, the method may further include:

Step 2003: duplication transmission is performed by using a determined leg.

In this embodiment, reference may be made to Embodiment 6 for the method for performing duplication transmission in step 2003, which shall not be described herein any further.

It can be seen from the above embodiment that the user equipment configured with operations of carrier aggregation and/or at least two connectivities may determine the leg for performing duplication transmission by itself. Hence, duplication transmission having three or more transmission legs may be supported, and gains of the duplication transmission to reliability of data transmission and relatively high radio resource utilization may be ensured. And as it is not needed to receive the configuration and/or activation/deactivation signaling for duplication transmission from the network device side, signaling overhead of the network may be saved, occupation of radio resources may be reduced, and network-implemented algorithm may be simplified.

Embodiment 13

The embodiment of this disclosure provides a method for duplication transmission, which corresponds to Embodiment 12, and is applicable to a network device side and a user equipment side.

Figure 21:
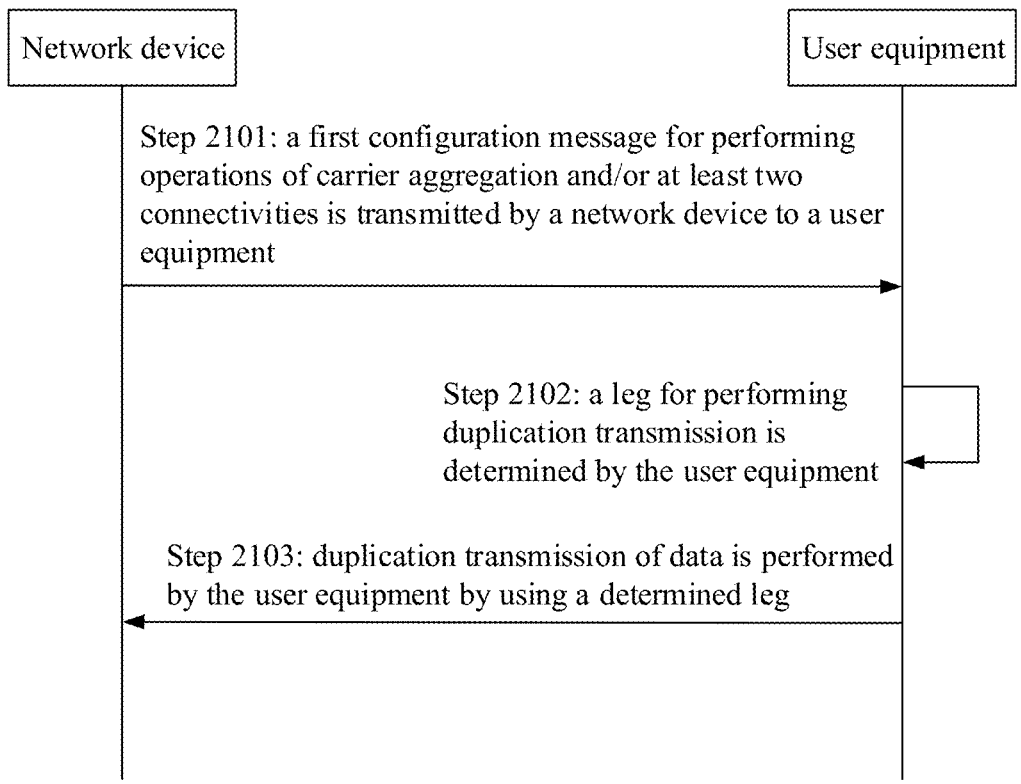
FIG. 21 is a schematic diagram of the method for duplication transmission of Embodiment 13 of this disclosure.

FIG. 21 is a schematic diagram of the method for duplication transmission of Embodiment 13 of this disclosure. As shown in FIG. 21, the method includes:

Step 2101: a first configuration message for performing operations of carrier aggregation and/or at least two connectivities is transmitted by a network device to a user equipment;

Step 2102: a leg for performing duplication transmission is determined by the user equipment; and Step 2103: duplication transmission of data is performed by the user equipment by using a determined leg.

In this embodiment, reference may be made to what is contained in Embodiment 1 for specific implementations of step 2101, reference may be made to what is contained in Embodiment 12 for specific implementations of step 2102, and reference may be made to what is contained in Embodiment 6 for specific implementations of step 2103, which shall not be described herein any further.

It can be seen from the above embodiment that the user equipment configured with operations of carrier aggregation and/or at least two connectivities may determine the leg for performing duplication transmission by itself. Hence, duplication transmission having three or more transmission legs may be supported, and gains of the duplication transmission to reliability of data transmission and relatively high radio resource utilization may be ensured. And as it is not needed to receive the configuration and/or activation/deactivation signaling for duplication transmission from the network device side, signaling overhead of the network may be saved, occupation of radio resources may be reduced, and network-implemented algorithm may be simplified.

Embodiment 14

The embodiment of this disclosure provides a configuration and/or activation apparatus for duplication transmission, applicable to a network device side. This apparatus corresponds to the configuration and/or activation method for duplication transmission described in embodiments 1-5, and reference may be made to embodiments 1-5 for a particular implementation of the apparatus, with repeated parts being going to be described herein any further.

Figure 22:
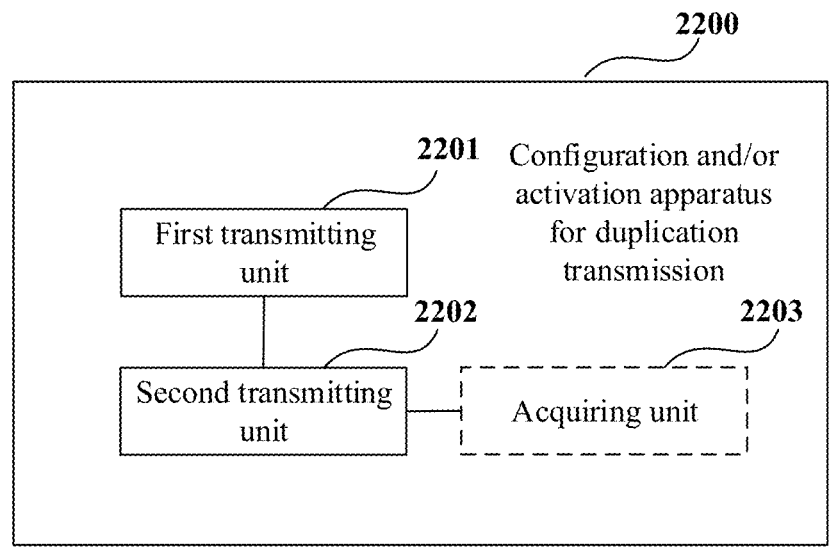
FIG. 22 is a schematic diagram of the configuration and/or activation apparatus for duplication transmission of Embodiment 14 of this disclosure.

FIG. 22 is a schematic diagram of the configuration and/or activation apparatus for duplication transmission of Embodiment 14 of this disclosure. As shown in FIG. 22, an apparatus 2200 includes:

a first transmitting unit 2201 configured to transmit a first configuration message for configuring a user equipment to perform operations of carrier aggregation and/or at least two connectivities to the user equipment; and a second transmitting unit 2202 configured to transmit second configuration message for duplication transmission, and/or activation/deactivation signaling for duplication transmission, to the user equipment.

In this embodiment, corresponding to Embodiment 2, the second configuration message includes at least one piece of the following information: information on a leg used by at least one data radio bearer (DRB) in performing duplication transmission; information on whether at least one leg is able to be used for duplication transmission; and information on a DRB using at least one leg configured to be used for duplication transmission.

In this embodiment, the information on a leg used by at least one data radio bearer (DRB) in performing duplication transmission includes at least one of the following: a network device identifier, a cell group identifier, a radio link control (RLC) entity identifier and a logic channel identifier used by the at least one DRB in performing duplication transmission; the information on whether at least one leg is able to be used for duplication transmission includes: information on whether at least one network device or at least one cell group is able to be used for duplication transmission; and the information on a DRB using at least one leg configured to be used for duplication transmission includes: information on a DRB using at least one network device or cell group configured to be used for duplication transmission, such as an identifier or index of the DRB.

In this embodiment, the second configuration message may be radio resource control (RRC) signaling.

For example, the second configuration message is an RRCreconfiguration message or an RRCresume message or an RRCSetup message or an RRCReestablishment message.

In this embodiment, for a DRB, when at least two network device identifiers or at least two cell group identifiers used for duplication transmission configured for the DRB are identical, it indicates that the DRB performs duplication transmission in a carrier aggregation (CA) mode.

In this embodiment, for at least one DRB configured with duplication transmission, the second transmitting unit 2202 may configure its mode of duplication transmission to be a carrier aggregation (CA) mode or a mode of using at least two network devices or at least two cell groups for duplication transmission.

In this embodiment, the second configuration message and the first configuration message may be the same message. In other words, information in the first configuration message and information in the second configuration message may be contained in the same message (such as an RRC reconfiguration message, or an RRC resume message, etc.). For example, the network device transmits a configuration message containing the information in the first configuration message and the information in the second configuration message to the user equipment, in which case transmission of the first configuration message by the first transmitting unit 2201 and transmission of the second configuration message by the second transmitting unit 2202 are performed in a combined manner, for example, the first transmitting unit 2201 and the second transmitting unit 2202 may be combined into one transmitting unit.

In this embodiment, corresponding to Embodiment 3, the second transmitting unit 2202 of a network device transmits the activation/deactivation signaling for duplication transmission to the user equipment, and/or, the second transmitting unit 2202 of another network device transmits the activation/deactivation signaling for duplication transmission to the user equipment; wherein the activation/deactivation signaling for duplication transmission transmitted by the network device to the user equipment includes indication on an activation status of the duplication transmission of a DRB in the network device, and the activation/deactivation signaling for duplication transmission transmitted by the other network to the user equipment includes indication on an activation status of the duplication transmission of the DRB in the other network device; wherein the user equipment, the network device and the other network device are configured as at least two connectivities. That is, at least two network devices configured as multiple connectivities transmit respective activation/deactivation signaling for duplication transmission to the user equipment, respectively. Reference may be made to what is contained in Embodiment 3 for other contents of activation/deactivation signaling, which shall not be described herein any further.

In this embodiment, corresponding to Embodiment 4, the activation/deactivation signaling may include indication on a use status of a leg used for the duplication transmission. The second transmitting unit 2202 may transmit the activation/deactivation signaling via a MAC CE or a PDCP control PDU. The leg may include at least one of a network device, a cell group, a media access control (MAC) entity, a radio link control (RLC) entity and a logic channel. And the indication on a use status of a leg used for the duplication transmission may include: a use status of a network device, or a cell group, or an MAC entity, or an RLC entity or a logic channel corresponding to an index or an identifier of the network device, or the cell group, or the MAC entity, or the RLC entity or the logic channel. Reference may be made to Embodiment 4 for other contents of the activation/deactivation signaling, which shall not be described herein any further.

In this embodiment, corresponding to Embodiment 5, the activation/deactivation signaling may include indication on use statuses of legs of at least one DRB configured with duplication transmission. The second transmitting unit 2202 may transmit the activation/deactivation signaling via a MAC CE or a PDCP control PDU. And the indication on a use status may include: for at least one DRB configured with duplication transmission, a use status of at least one leg. Reference may be made to Embodiment 5 for other contents of the activation/deactivation signaling, which shall not be described herein any further.

Furthermore, corresponding to embodiments 4 and 5, the apparatus may further include:

an acquiring unit 2203 configured to obtain a use status related to duplication transmission of another network device or cell group than a network device or cell group transmitting the activation/deactivation signaling. The user equipment, the network device and the other network device are configured as at least two connectivities. Reference may be made to what is contained in embodiments 4 and 5 for particular implementations thereof, which shall not be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 15

The embodiment of this disclosure provides an apparatus for duplication transmission, applicable to a user equipment side. This apparatus corresponds to the methods for duplication transmission described in embodiments 6-10, and reference may be made to embodiments 6-10 for a particular implementation of the apparatus, with repeated parts being going to be described herein any further.

Figure 23:
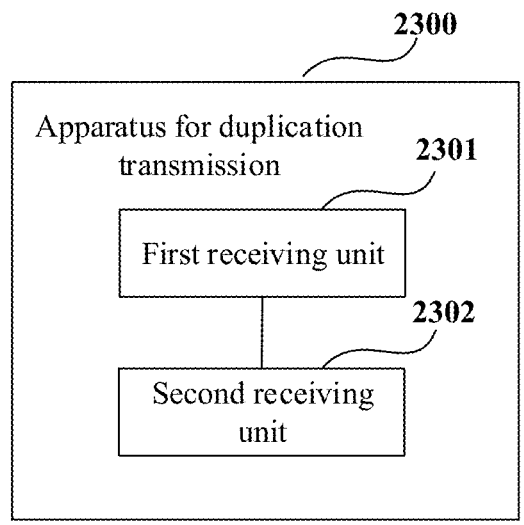
FIG. 23 is a schematic diagram of the apparatus for duplication transmission of Embodiment 15 of this disclosure.

FIG. 23 is a schematic diagram of the apparatus for duplication transmission of Embodiment 15 of this disclosure. As shown in FIG. 23, an apparatus 2300 includes:

a first receiving unit 2301 configured to receive from a network device a first configuration message for configuring a user equipment to perform operations of carrier aggregation and/or at least two connectivities; and a second receiving unit 2302 configured to receive a second configuration message for duplication transmission, and/or activation/deactivation signaling for duplication transmission, from the network device.

In this embodiment, corresponding to Embodiment 6, the second configuration message may include at least one piece of the following information: information on a leg used by at least one data radio bearer (DRB) in performing duplication transmission; information on whether at least one leg is able to be used for duplication transmission; and information on a DRB using at least one leg configured to be used for duplication transmission.

In this embodiment, the information on a leg used by at least one data radio bearer (DRB) in performing duplication transmission may include at least one of the following: a network device identifier, a cell group identifier, an RLC entity identifier and a logic channel identifier used by the at least one DRB in performing duplication transmission; the information on whether at least one leg is able to be used for duplication transmission may include: information on whether at least one network device or at least one cell group is able to be used for duplication transmission; and the information on a DRB using at least one leg configured to be used for duplication transmission may include: information on a DRB configured with at least one network device or cell group to use the network device or cell group for duplication transmission, such as an identifier or index of the DRB.

In this embodiment, the second configuration message may be radio resource control (RRC) signaling.

For example, the second configuration message is an RRCreconfiguration message or an RRCresume message or an RRC Setup message or an RRCReestablishment message.

In this embodiment, for a DRB, when at least two network device identifiers or at least two cell group identifiers used for duplication transmission configured for the DRB are identical, it indicates that the DRB uses a carrier aggregation (CA) mode for performing duplication transmission.

In this embodiment, the second configuration message and the first configuration message may be the same message. In other words, information in the first configuration message and information in the second configuration message may be contained in the same message (such as an RRC reconfiguration message, or an RRC resume message, etc.). For example, the network device transmits a configuration message containing the information in the first configuration message and the information in the second configuration message to the user equipment, in which case reception of the first configuration message by the first receiving unit 2301 and reception of the second configuration message by the second transmitting unit 2302 are performed in a combined manner, for example, the first receiving unit 2301 and the second transmitting unit 2302 may be combined into one receiving unit.

Figure 24:
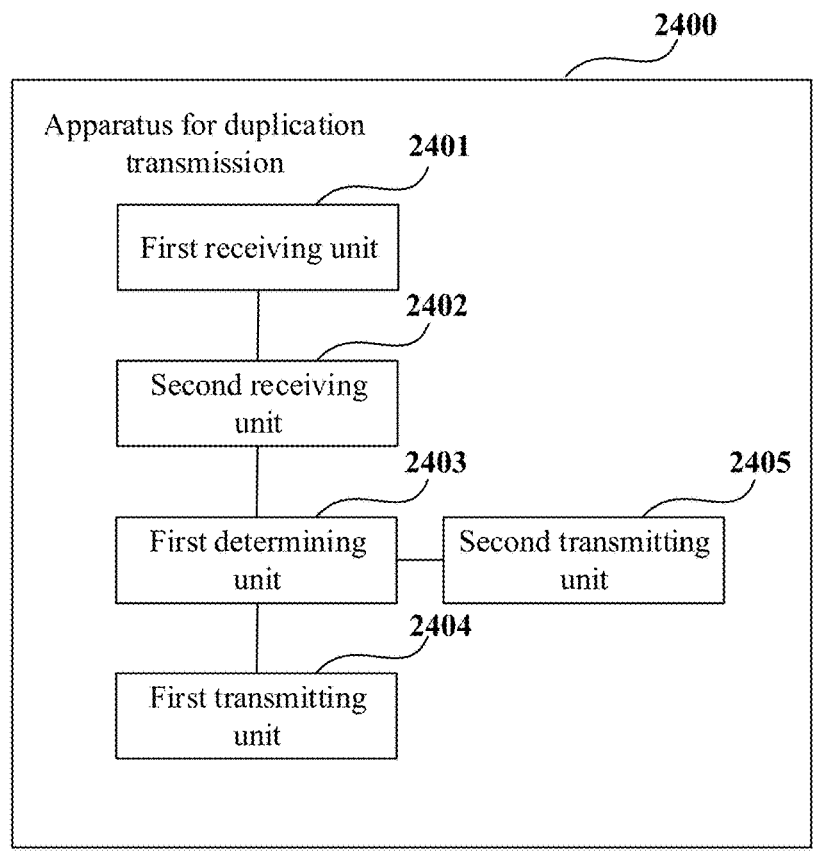
FIG. 24 is another schematic diagram of the apparatus for duplication transmission of Embodiment 15 of this disclosure.

FIG. 24 is another schematic diagram of the apparatus for duplication transmission of Embodiment 15 of this disclosure. This apparatus corresponds to Embodiment 8, and reference may be made to what is contained in Embodiment 8 for particulars thereof. As shown in FIG. 24, an apparatus 2400 includes:

a first receiving unit 2401 configured to receive from a network device a first configuration message for configuring a user equipment to perform operations of carrier aggregation and/or at least two connectivities; and a second receiving unit 2402 configured to receive a second configuration message for duplication transmission from the network device, and/or an indication of an activation status of duplication transmission of at least one DRB respectively from at least two network devices.

In this embodiment, the user equipment and the at least two network devices are configured as at least two connectivities.

In this embodiment, the apparatus 2400 may further include:

a first determining unit 2403 configured to enable at least one MAC entity of the user equipment corresponding to at least one network device or at least one cell group to determine an activation status of duplication transmission of at least one DRB related to the MAC entity according to the indication;

a first transmitting unit 2404 configured to enable at least one MAC entity of the user equipment corresponding to at least one network device or at least one cell group, for at least one DRB activating duplication transmission in the activation/deactivation signaling, to perform duplication transmission of the DRB by using the network device or the cell group, and/or enable at least one MAC entity of the user equipment corresponding to at least one network device or at least one cell group, for at least one DRB deactivating duplication transmission in the activation/deactivation signaling, not to perform duplication transmission of the DRB by using the network device or the cell group; and a second transmitting unit 2405 configured to enable the at least one MAC entity of the user equipment corresponding to at least one network device or at least one cell group, for at least one DRB activating duplication transmission in the activation/deactivation signaling, to perform duplication transmission of the DRB by using an RLC entity and/or logical channel associated with the MAC entity configured for the DRB, and/or enable the at least one MAC entity of the user equipment corresponding to at least one network device or at least one cell group, for at least one DRB deactivating duplication transmission in the activation/deactivation signaling, not to perform duplication transmission of the DRB by using an RLC entity and/or logical channel associated with the MAC entity configured for the DRB.

In this embodiment, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Figure 25:
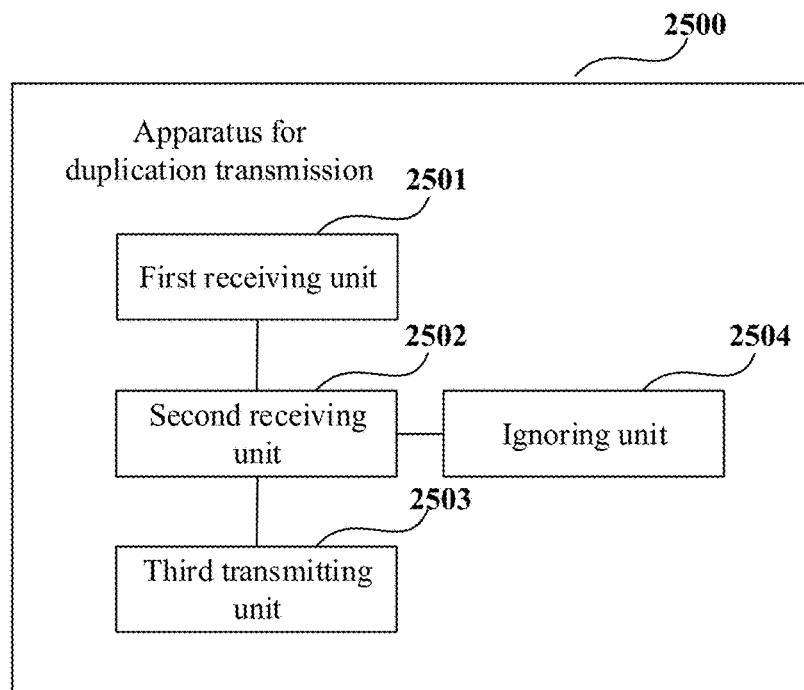
FIG. 25 is a further schematic diagram of the apparatus for duplication transmission of Embodiment 15 of this disclosure.

FIG. 25 is a further schematic diagram of the apparatus for duplication transmission of Embodiment 15 of this disclosure. This apparatus corresponds to Embodiment 9, and reference may be made to what is contained in Embodiment 9 for particulars thereof. As shown in FIG. 25, an apparatus 2500 includes:

a first receiving unit 2501 configured to receive from a network device a first configuration message for configuring a user equipment to perform operations of carrier aggregation and/or at least two connectivities;

a second receiving unit 2502 configured to receive a second configuration message for duplication transmission, and/or an indication of an activation status of a leg for duplication transmission, from the network device;

a third transmitting unit 2503 configured to, for all DRBs that are currently configured for split transmission and/or duplication transmission, use a leg of a use status being valid to perform duplication transmission, not use a leg of a use status being invalid to perform duplication transmission; and an ignoring unit 2504 configured to, for a DRB, for a leg that is not configured for split transmission of the DRB, ignore the indication on using the leg for performing duplication transmission.

In this embodiment, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Figure 26:
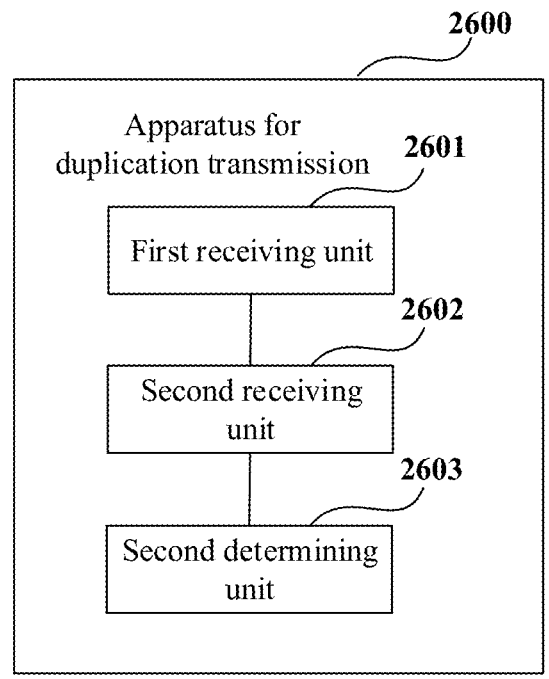
FIG. 26 is yet another schematic diagram of the apparatus for duplication transmission of Embodiment 15 of this disclosure.

FIG. 26 is yet another schematic diagram of the apparatus for duplication transmission of Embodiment 15 of this disclosure. This apparatus corresponds to Embodiment 10, and reference may be made to what is contained in Embodiment 10 for particulars thereof. As shown in FIG. 26, an apparatus 2600 includes:

a first receiving unit 2601 configured to receive from a network device a first configuration message for configuring a user equipment to perform operations of carrier aggregation and/or at least two connectivities;

a second receiving unit 2602 configured to receive an indication on use statuses of legs of a DRB configured with duplication transmission from the network device; and a second determining unit 2603 configured to determine a leg used by the DRB in performing duplication transmission according to the indication on use statuses of legs of at least one DRB configured with duplication transmission.

In this embodiment, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 16

The embodiment of this disclosure provides an apparatus for duplication transmission, applicable to a user equipment side. This apparatus corresponds to the method for duplication transmission described in Embodiment 12, and reference may be made to Embodiment 12 for a particular implementation of the apparatus, with repeated parts being going to be described herein any further.

Figure 27:
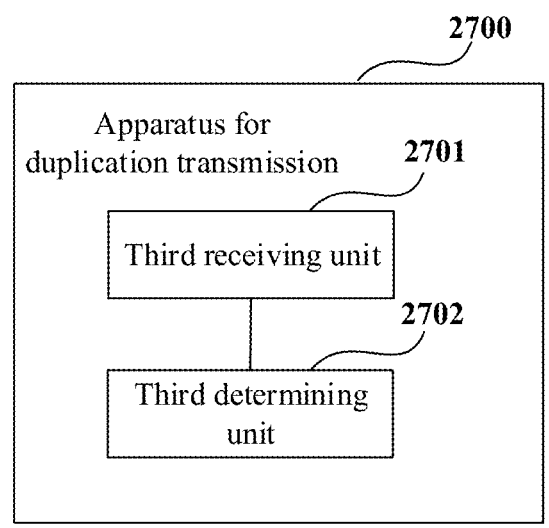
FIG. 27 is a schematic diagram of the apparatus for duplication transmission of Embodiment 16 of this disclosure.

FIG. 27 is a schematic diagram of the apparatus for duplication transmission of Embodiment 16 of this disclosure. As shown in FIG. 27, an apparatus 2700 includes:

a third receiving unit 2701 configured to receive a first configuration message for performing operations of carrier aggregation and/or at least two connectivities; and a third determining unit 2702 configured to determine a leg used for performing duplication transmission.

In this embodiment, the third determining unit 2702 may determine the leg for performing duplication transmission according to at least one of a transmission success rate, a downlink measurement result and an uplink measurement result.

In this embodiment, for at least one DRB configured with duplication transmission, the third determining unit 2702 may determine the leg for performing duplication transmission of the DRB, or for all DRBs configured for duplication transmission, the third determining unit 2702 may determine the leg for duplication transmission.

In this embodiment, the third determining unit 2702 may determine the leg via a PDCP entity.

It can be seen from the above embodiment that the user equipment configured with operations of carrier aggregation and/or at least two connectivities may determine the leg for performing duplication transmission by itself. Hence, duplication transmission having three or more transmission legs may be supported, and gains of the duplication transmission to reliability of data transmission and relatively high radio resource utilization may be ensured. And as it is not needed to receive the configuration and/or activation/deactivation signaling for duplication transmission from the network device side, signaling overhead of the network may be saved, occupation of radio resources may be reduced, and network-implemented algorithm may be simplified.

Embodiment 17

The embodiment of this disclosure provides a network device, including the configuration and/or activation apparatus for duplication transmission described in Embodiment 14.

Figure 28:
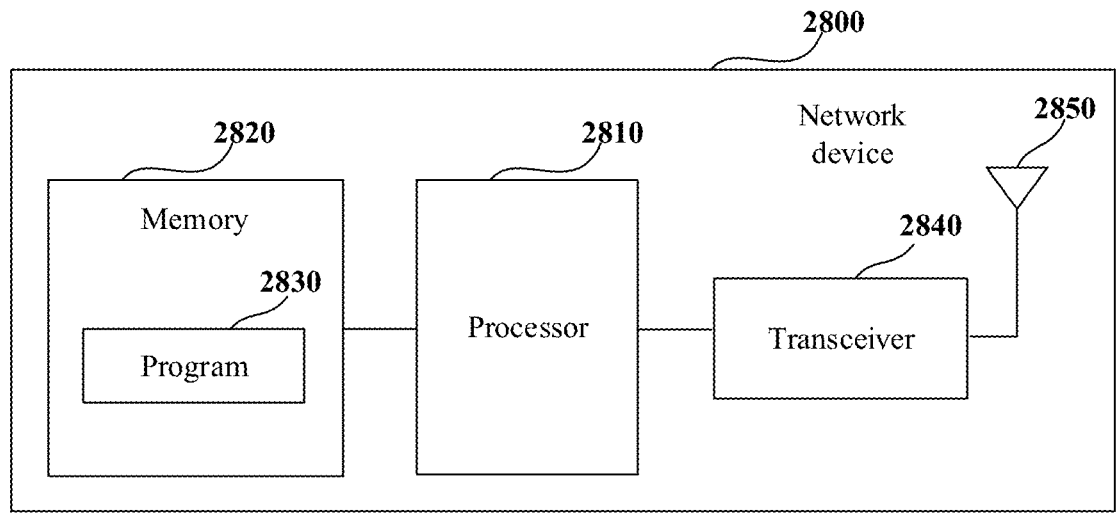
FIG. 28 is a schematic diagram of a structure of the network device of Embodiment 17 of this disclosure.

FIG. 28 is a schematic diagram of a structure of the network device of Embodiment 17 of this disclosure. As shown in FIG. 28, a network device 2800 may include a processor 2810 and a memory 2820, the memory 2820 being coupled to the processor 2810. In this embodiment, the memory 2820 may store various data, and furthermore, it may store a program 2830 for data processing, and execute the program 2830 under control of the processor 2810, to receive various information transmitted by a user equipment, and transmit various information to the user equipment.

In one implementation, the functions of the configuration and/or activation apparatus for duplication transmission may be integrated into the processor 2810. For example, the processor 2810 may be configured to: transmit a first configuration message for configuring a user equipment to perform operations of carrier aggregation and/or at least two connectivities to the user equipment; and transmit second configuration message for duplication transmission, and/or activation/deactivation signaling for duplication transmission, to the user equipment.

In another implementation, the configuration and/or activation apparatus for duplication transmission and the processor 2810 may be configured separately; for example, the configuration and/or activation apparatus for duplication transmission may be configured as a chip connected to the processor 2810, and the functions of the configuration and/or activation apparatus for duplication transmission are executed under control of the processor 2810.

Furthermore, as shown in FIG. 28, the network device 2800 may include a transceiver 2840, and an antenna 2850, etc. For example, functions of the above components are similar to those in the related art, and shall not be described herein any further. It should be noted that the network device 2800 does not necessarily include all the parts shown in FIG. 28. Furthermore, the network device 2800 may include parts not shown in FIG. 28, and the related art may be referred to.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 18

The embodiment of this disclosure provides a user equipment, including the apparatus for duplication transmission described in Embodiment 15.

Figure 29:
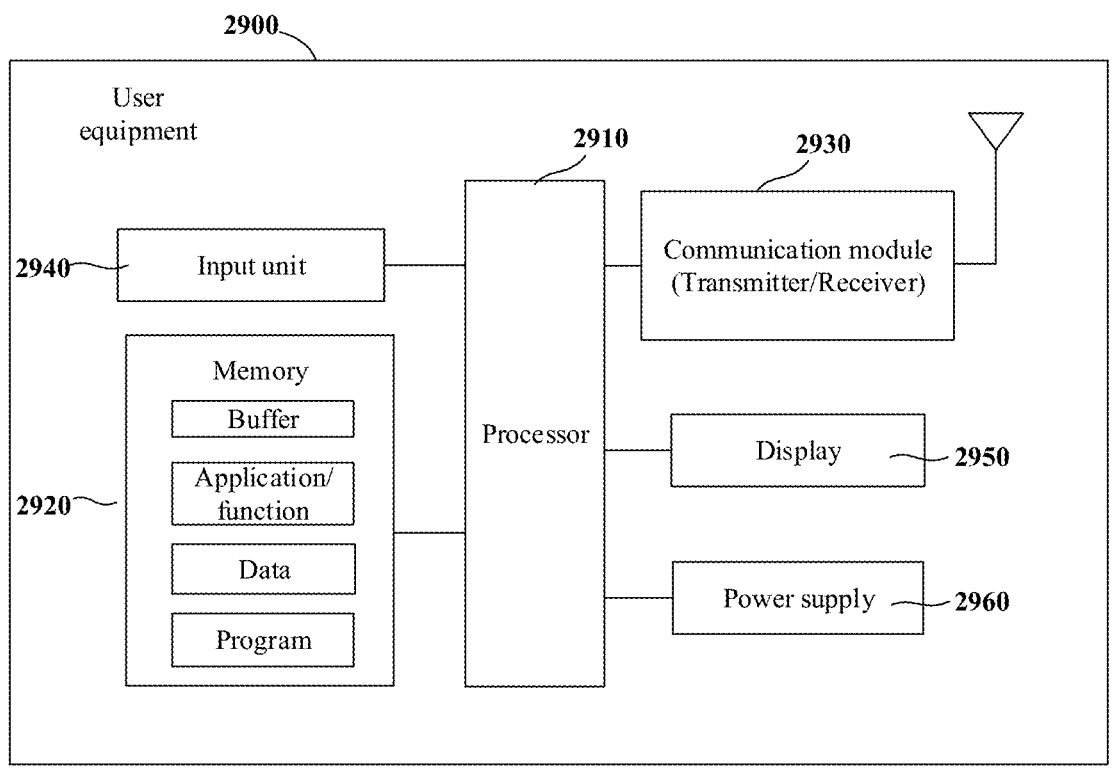
FIG. 29 is a block diagram of a systematic structure of the UE of Embodiment 18 of this disclosure.

FIG. 29 is a block diagram of a systematic structure of the user equipment of Embodiment 18 of this disclosure. As shown in FIG. 29, a user equipment 2900 may include a processor 2910 and a memory 2920, the memory 2920 being coupled to the processor 2910. It should be noted that this figure is illustrative only, and other types of structures may also be used, so as to supplement or replace this structure and achieve a telecommunications function or other functions.

In one implementation, the functions of the apparatus for duplication transmission may be integrated into the processor 2910. For example, the processor 2910 may be configured to: receive from a network device a first configuration message for configuring a user equipment to perform operations of carrier aggregation and/or at least two connectivities; and receive a second configuration message for duplication transmission, and/or activation/deactivation signaling for duplication transmission, from the network device.

In another implementation, the apparatus for duplication transmission and the processor 2910 may be configured separately; for example, the apparatus for duplication transmission may be configured as a chip connected to the processor 2910, and the functions of the apparatus for duplication transmission are executed under control of the processor 2910.

As shown in FIG. 29, the user equipment 2900 may further include a communication module 2930, an input unit 2940, a display 2950, and a power supply 2960, etc. It should be noted that the user equipment 2900 does not necessarily include all the parts shown in FIG. 29. Furthermore, the user equipment 2900 may include parts not shown in FIG. 29, and the related art may be referred to.

As shown in FIG. 29, the processor 2910 is sometimes referred to as a controller or an operational control, which may include a microprocessor or other processor devices and/or logic devices. The processor 2910 receives input and controls operations of components of the user equipment 2900.

For example, the memory 2920 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2910 may execute programs stored in the memory 2920, so as to realize information storage or processing, etc. Functions of other parts are similar to those of the related art, which shall not be described herein any further. The parts of the user equipment 2900 may be realized by specific hardware, firmware, software, or any combination thereof, without departing from the scope of this disclosure.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

Embodiment 19

The embodiment of this disclosure provides a user equipment, including the apparatus for duplication transmission described in Embodiment 16.

Figure 30:
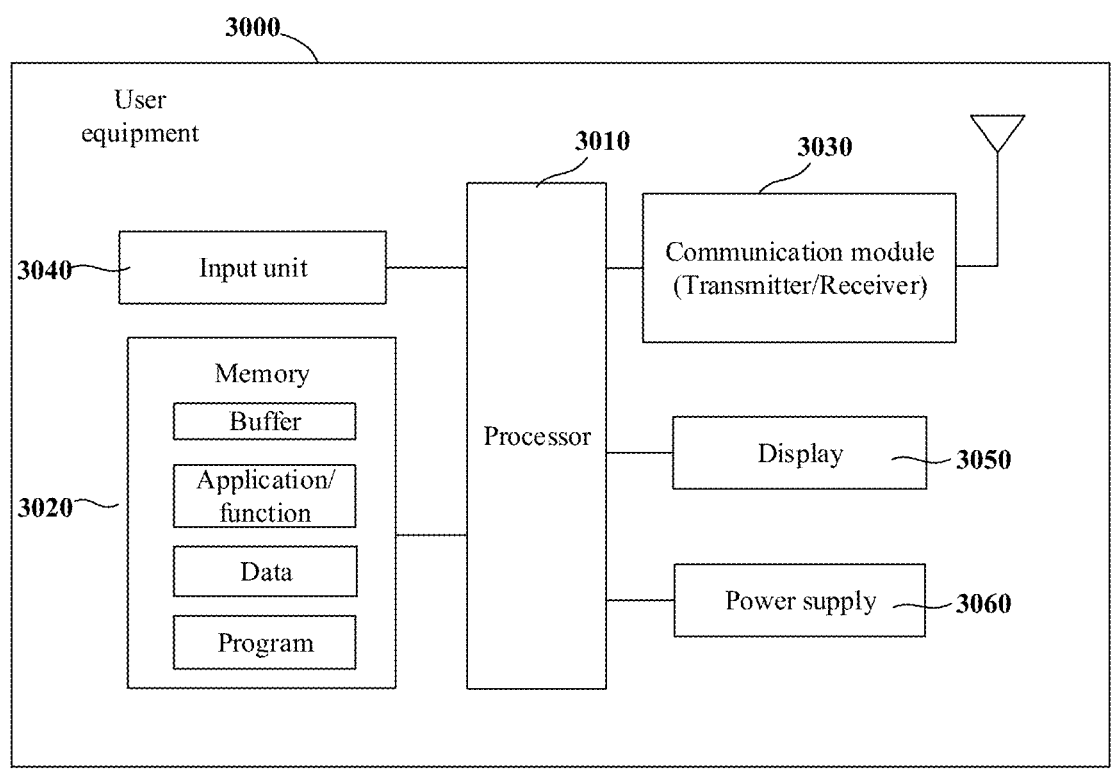
FIG. 30 is a block diagram of a systematic structure of the UE of Embodiment 19 of this disclosure.

FIG. 30 is a block diagram of a systematic structure of the user equipment of Embodiment 19 of this disclosure. As shown in FIG. 30, a user equipment 3000 may include a processor 3010 and a memory 3020, the memory 3020 being coupled to the processor 3010. It should be noted that this figure is illustrative only, and other types of structures may also be used, so as to supplement or replace this structure and achieve a telecommunications function or other functions.

In one implementation, the functions of the apparatus for duplication transmission may be integrated into the processor 3010. The processor 3010 may be configured to: receive by a user equipment a first configuration message for performing operations of carrier aggregation and/or at least two connectivities; and determine by the user equipment a leg used for performing duplication transmission.

In another implementation, the apparatus for duplication transmission and the processor 3010 may be configured separately; for example, the apparatus for duplication transmission may be configured as a chip connected to the processor 3010, and the functions of the apparatus for duplication transmission are executed under control of the processor 3010.

As shown in FIG. 30, the user equipment 3000 may further include a communication module 3030, an input unit 3040, a display 3050, and a power supply 3060, etc. It should be noted that the user equipment 3000 does not necessarily include all the parts shown in FIG. 30. Furthermore, the user equipment 3000 may include parts not shown in FIG. 30, and the related art may be referred to.

As shown in FIG. 30, the processor 3010 is sometimes referred to as a controller or an operational control, which may include a microprocessor or other processor devices and/or logic devices. The processor 3010 receives input and controls operations of components of the user equipment 3000.

For example, the memory 3020 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 3010 may execute programs stored in the memory 3020, so as to realize information storage or processing, etc. Functions of other parts are similar to those of the related art, which shall not be described herein any further. The parts of the user equipment 3000 may be realized by specific hardware, firmware, software, or any combination thereof, without departing from the scope of this disclosure.

It can be seen from the above embodiment that the user equipment configured with operations of carrier aggregation and/or at least two connectivities may determine the leg for performing duplication transmission by itself. Hence, duplication transmission having three or more transmission legs may be supported, and gains of the duplication transmission to reliability of data transmission and relatively high radio resource utilization may be ensured. And as it is not needed to receive the configuration and/or activation/deactivation signaling for duplication transmission from the network device side, signaling overhead of the network may be saved, occupation of radio resources may be reduced, and network-implemented algorithm may be simplified.

Embodiment 20

The embodiment of this disclosure provides a communications system, including the network device described in Embodiment 17 and/or the user equipment described in Embodiment 18 or 19. For example, reference may be made to FIG. 1 for a structure of the communications system. As shown in FIG. 1, the communications system 100 includes a first network device 101, a second network device 102, a third network device 103, and a user equipment 104. At least one of the first network device 101, the second network device 102 and the third network device 103 is identical to what is contained in Embodiment 17, and the user equipment 104 is identical to what is contained in Embodiment 18 or 19, with repeated parts being not going to be described herein any further.

It can be seen from the above embodiment that the configuration message used for duplication transmission and/or activation/deactivation signaling used for duplication transmission is/are transmitted to the user equipment configured with operations of carrier aggregation and/or at least two connectivities, hence, duplication transmission having three or more transmission legs may be supported. And when the user equipment is configured as multi-connectivity or carrier aggregation of multi-leg, a leg of relatively good quality may be used for duplication transmission of data, which ensures gains of the duplication transmission to reliability of data transmission, overmuch radio resources will not be occupied, and relatively high radio resource utilization may be ensured.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 22 may either correspond to software modules of procedures of a computer program, or correspond to hardware modules. Such software modules may respectively correspond to the steps shown in FIGS. 2 and 7. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 22 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 22 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Regarding implementations containing the above embodiments, following supplements are further discloses:

Supplement 1. A configuration and/or activation apparatus for duplication transmission, including:

a first transmitting unit configured to transmit a first configuration message for configuring a user equipment to perform operations of carrier aggregation and/or at least two connectivities to the user equipment; and a second transmitting unit configured to transmit second configuration message for duplication transmission, and/or activation/deactivation signaling for duplication transmission, to the user equipment.

Supplement 2. The apparatus according to supplement 1, wherein, the second configuration message transmitted to the user equipment includes at least one piece of the following information:

information on a leg used by at least one data radio bearer (DRB) in performing duplication transmission;

information on whether at least one leg is able to be used for duplication transmission; and information on a DRB using at least one leg configured to be used for duplication transmission.

Supplement 3. The apparatus according to supplement 2, wherein, the information on a leg used by at least one data radio bearer (DRB) in performing duplication transmission includes at least one of the following: a network device identifier, a cell group identifier, a radio link control (RLC) entity identifier and a logic channel identifier used by the at least one DRB in performing duplication transmission;

the information on whether at least one leg is able to be used for duplication transmission includes: information on whether at least one network device or at least one cell group is able to be used for duplication transmission;

and the information on a DRB using at least one leg configured to be used for duplication transmission includes: information on a DRB using at least one network device or cell group configured to be used for duplication transmission.

Supplement 4. The apparatus according to any one of supplements 1-3, wherein, the second configuration message is radio resource control (RRC) signaling.

Supplement 5. The apparatus according to supplement 4, wherein, the second configuration message is an RRCreconfiguration message or an RRCresume message or an RRC Setup message or an RRCReestablishment message.

Supplement 6. The apparatus according to supplement 3, wherein, for a DRB, when at least two network device identifiers or at least two cell group identifiers used for duplication transmission configured for the DRB are identical, it indicates that the DRB performs duplication transmission in a carrier aggregation (CA) mode.

Supplement 7. The apparatus according to any one of supplements 1-6, wherein, for at least one DRB configured with duplication transmission, the second transmitting unit configures its mode of duplication transmission to be a carrier aggregation (CA) mode or a mode of using at least two network devices or at least two cell groups for duplication transmission.

Supplement 8. The apparatus according to any one of supplements 1-7, wherein, the second configuration message and the first configuration message are the same message.

Supplement 9. The apparatus according to any one of supplements 1-8, wherein, the second transmitting unit of a network device transmits the activation/deactivation signaling for duplication transmission to the user equipment, the activation/deactivation signaling including indication on an activation status of the duplication transmission of a DRB in the network device; and/or the second transmitting unit of another network device transmits the activation/deactivation signaling for duplication transmission to the user equipment, the activation/deactivation signaling including indication on an activation status of the duplication transmission of a DRB in the other network device;

and the user equipment, the network device and the other network device are configured as at least two connectivities.

Supplement 10. The apparatus according to any one of supplements 1-8, wherein, the activation/deactivation signaling includes indication on a use status of a leg used for the duplication transmission.

Supplement 11. The apparatus according to supplement 10, wherein, the leg includes at least one of a network device, a cell group, a media access control (MAC) entity, a radio link control (RLC) entity and a logic channel.

Supplement 12. The apparatus according to supplement 11, wherein, the indication on a use status of a leg used for the duplication transmission includes: a use status of a network device, or a cell group, or an MAC entity, or an RLC entity or a logic channel corresponding to an index or an identifier of the network device, or the cell group, or the MAC entity, or the RLC entity or the logic channel.

Supplement 13. The apparatus according to supplement 12, wherein, for all DRBs that are currently configured for split transmission and/or duplication transmission, when the use status is valid, it indicates that the DRBs use the network device or cell group or MAC entity or RLC entity or logical channel to perform duplication transmission;

and when the use status is invalid, it indicates that the DRBs do not use the network device or cell group or MAC entity or RLC entity or logical channel to perform duplication transmission.

Supplement 14. The apparatus according to any one of supplements 10-13, wherein, the activation/deactivation signaling is a media access control control element (MAC CE) or a packet data convergence protocol (PDCP) control protocol data unit (PDU).

Supplement 15. The apparatus according to supplement 1, wherein, the activation/deactivation signaling includes indication on use statuses of legs of at least one DRB configured with duplication transmission.

Supplement 16. The apparatus according to supplement 15, wherein, the activation/deactivation signaling further includes a mapping relationship between the at least one DRB configured with duplication transmission and the leg.

Supplement 17. The apparatus according supplement 15 or 16, wherein, the activation/deactivation signaling is a MAC CE or a PDCP control PDU.

Supplement 18. The apparatus according supplement 15 or 16, wherein, the indication on a use status includes: for at least one DRB configured with duplication transmission, a use status of at least one leg.

Supplement 19. The apparatus according supplement 18, wherein, the leg includes at least one of a network device, a cell group, an MAC entity, an RLC entity and a logical channel;

when the use status is valid, it indicates that the network device or cell group or MAC entity or RLC entity or logical channel is used for performing duplication transmission;

and when the use status is invalid, it indicates that the network device or cell group or MAC entity or RLC entity or logical channel is not used for performing duplication transmission.

Supplement 20. The apparatus according to any one of supplements 10-19, wherein the apparatus further includes:

an acquiring unit configured to obtain a use status related to duplication transmission of another network device or cell group than a network device or cell group transmitting the activation/deactivation signaling;

and the user equipment, the network device and the other network device are configured as at least two connectivities.

Supplement 21. An apparatus for duplication transmission, including:

a first receiving unit configured to receive from a network device a first configuration message for configuring a user equipment to perform operations of carrier aggregation and/or at least two connectivities; and a second receiving unit configured to receive a second configuration message for duplication transmission, and/or activation/deactivation signaling for duplication transmission, from the network device.

Supplement 22. The apparatus according to supplement 21, wherein, the second configuration message received from the network device includes at least one piece of the following information:

information on a leg used by at least one data radio bearer (DRB) in performing duplication transmission;

information on whether at least one leg is able to be used for duplication transmission; and information on a DRB using at least one leg configured to be used for duplication transmission.

Supplement 23. The apparatus according to supplement 22, wherein, the information on a leg used by at least one data radio bearer (DRB) in performing duplication transmission includes at least one of the following: a network device identifier, a cell group identifier, an RLC entity identifier and a logic channel identifier used by the at least one DRB in performing duplication transmission;

the information on whether at least one leg is able to be used for duplication transmission includes: information on whether at least one network device or at least one cell group is able to be used for duplication transmission;

and the information on a DRB using at least one leg configured to be used for duplication transmission includes: information on a DRB using at least one network device or cell group configured to be used for duplication transmission.

Supplement 24. The apparatus according to any one of supplements 21-23, wherein, the second configuration message received from the network device is radio resource control (RRC) signaling.

Supplement 25. The apparatus according to supplement 24, wherein, the second configuration message is an RRCreconfiguration message or an RRCresume message or an RRC Setup message or an RRCReestablishment message.

Supplement 26. The apparatus according to supplement 23, wherein, for a DRB, when at least two network device identifiers or at least two cell group identifiers used for duplication transmission configured for the DRB are identical, it indicates that the DRB performs duplication transmission in a carrier aggregation (CA) mode.

Supplement 27. The apparatus according to any one of supplements 21-26, wherein, for at least one DRB configured with duplication transmission, its mode of duplication transmission is configured to be a carrier aggregation (CA) mode or a mode of using at least two network devices or at least two cell groups for duplication transmission.

Supplement 28. The apparatus according to any one of supplements 21-27, wherein, the second configuration message and the first configuration message received from the network device are the same message.

Supplement 29. The apparatus according to any one of supplements 21-28, wherein, the second receiving unit receives indication on an activation status of duplication transmission of at least one DRB respectively from at least two network devices;

and the user equipment and the at least two network devices are configured as at least two connectivities.

Supplement 30. The apparatus according to supplement 29, wherein the apparatus further includes:

a first determining unit configured to enable at least one MAC entity of the user equipment corresponding to at least one network device or at least one cell group to determine an activation status of duplication transmission of at least one DRB related to the MAC entity according to the indication.

Supplement 31. The apparatus according to supplement 29 or 30, wherein the apparatus further includes:

a first transmitting unit configured to enable at least one MAC entity of the user equipment corresponding to at least one network device or at least one cell group, for at least one DRB activating duplication transmission in the activation/deactivation signaling, to perform duplication transmission of the DRB by using the network device or the cell group, and/or enable at least one MAC entity of the user equipment corresponding to at least one network device or at least one cell group, for at least one DRB deactivating duplication transmission in the activation/deactivation signaling, not to perform duplication transmission of the DRB by using the network device or the cell group.

Supplement 32. The apparatus according to supplement 29 or 30, wherein the apparatus further includes:

a second transmitting unit configured to enable the at least one MAC entity of the user equipment corresponding to at least one network device or at least one cell group, for at least one DRB activating duplication transmission in the activation/deactivation signaling, to perform duplication transmission of the DRB by using an RLC entity and/or logical channel associated with the MAC entity configured for the DRB, and/or enable the at least one MAC entity of the user equipment corresponding to at least one network device or at least one cell group, for at least one DRB deactivating duplication transmission in the activation/deactivation signaling, not to perform duplication transmission of the DRB by using an RLC entity and/or logical channel associated with the MAC entity configured for the DRB.

Supplement 33. The apparatus according to any one of supplements 29-32, wherein, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Supplement 34. The apparatus according to supplement 21, wherein, the second receiving unit receives indication on a use status of the leg used for the duplication transmission from the network device.

Supplement 35. The apparatus according to supplement 34, wherein the apparatus further includes:

a third transmitting unit configured to, for all DRBs that are currently configured for split transmission and/or duplication transmission, use a leg of a use status being valid to perform duplication transmission, not use a leg of a use status being invalid to perform duplication transmission.

Supplement 36. The apparatus according to supplement 34 or 35, wherein the apparatus further includes:

an ignoring unit configured to, for a DRB, for a leg that is not configured for split transmission of the DRB, ignore the indication on using the leg for performing duplication transmission.

Supplement 37. The apparatus according to any one of supplements 34-36, wherein, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Supplement 38. The apparatus according to any one of supplements 21-28, wherein, the activation/deactivation signaling received by the second receiving unit includes indication on use statuses of legs of the at least one DRB configured with duplication transmission.

Supplement 39. The apparatus according to supplement 38, wherein the apparatus further includes:

a second determining unit configured to, according to the indication on use statuses of legs of the at least one DRB configured with duplication transmission, determine a leg used by the DRB in performing duplication transmission.

Supplement 40. The apparatus according to supplement 38 or 39, wherein, for a DRB performing duplication transmission by using a CA mode, when its duplication transmission is activated, all corresponding RLC entities and/or logical channels of the DRB in the network device or cell group are used for transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Supplement 41. An apparatus for duplication transmission, including:

a third receiving unit configured to receive a first configuration message for performing operations of carrier aggregation and/or at least two connectivities; and a third determining unit configured to determine a leg used for performing duplication transmission.

Supplement 42. The apparatus according to supplement 41, wherein, the third determining unit determines the leg for performing duplication transmission according to at least one of a transmission success rate, a downlink measurement result and an uplink measurement result.

Supplement 43. The apparatus according to supplement 41 or 42, wherein, for at least one DRB configured with duplication transmission, the third determining unit determines the leg for performing duplication transmission of the DRB, or for all DRBs configured for duplication transmission, the third determining unit determines the leg for duplication transmission.

Supplement 44. The apparatus according to any one of supplements 41-43, wherein, the third determining unit determines the leg via a PDCP entity.

Supplement 45. A network device, including the apparatus as described in any one of supplements 1-20.

Supplement 46. A user equipment, including the apparatus as described in any one of supplements 21-40 and/or the apparatus as described in any one of supplements 41-44.

Supplement 47. A communications system, including the network device as described in supplement 45 and/or the user equipment as described in supplement 46.

Supplement 48. A configuration and/or activation method for duplication transmission, including:

transmitting a first configuration message for configuring a user equipment to perform operations of carrier aggregation and/or at least two connectivities to the user equipment; and transmitting a second configuration message for duplication transmission, and/or activation/deactivation signaling for duplication transmission, to the user equipment.

Supplement 49. The method according to supplement 48, wherein, the second configuration message transmitted to the user equipment includes at least one piece of the following information:

information on a leg used by at least one data radio bearer (DRB) in performing duplication transmission;

information on whether at least one leg is able to be used for duplication transmission; and information on a DRB using at least one leg configured to be used for duplication transmission.

Supplement 50. The method according to supplement 49, wherein, the information on a leg used by at least one data radio bearer (DRB) in performing duplication transmission includes at least one of the following: a network device identifier, a cell group identifier, a radio link control (RLC) entity identifier and a logic channel identifier used by the at least one DRB in performing duplication transmission;

the information on whether at least one leg is able to be used for duplication transmission includes: information on whether at least one network device or at least one cell group is able to be used for duplication transmission;

and the information on a DRB using at least one leg configured to be used for duplication transmission includes: information on a DRB using at least one network device or cell group configured to be used for duplication transmission.

Supplement 51. The method according to any one of supplements 48-50, wherein, the second configuration message is radio resource control (RRC) signaling.

Supplement 52. The method according to supplement 51, wherein, the second configuration message is an RRCreconfiguration message or an RRCresume message or an RRCSetup message or an RRCReestablishment message.

Supplement 53. The method according to supplement 50, wherein, for a DRB, when at least two network device identifiers or at least two cell group identifiers used for duplication transmission configured for the DRB are identical, it indicates that the DRB performs duplication transmission in a carrier aggregation (CA) mode.

Supplement 54. The method according to any one of supplements 48-53, wherein, the transmitting a second configuration message for duplication transmission to the user equipment includes:

for at least one DRB configured with duplication transmission, configuring its mode of duplication transmission to be a carrier aggregation (CA) mode or using at least two network devices or at least two cell groups for duplication transmission.

Supplement 55. The method according to any one of supplements 48-54, wherein, the second configuration message and the first configuration message are the same message.

Supplement 56. The method according to any one of supplements 48-55, wherein the transmitting activation/deactivation signaling for duplication transmission to the user equipment includes:

transmitting the activation/deactivation signaling for duplication transmission by a network device to the user equipment, the activation/deactivation signaling including indication on an activation status of the duplication transmission of a DRB in the network device; and/or transmitting the activation/deactivation signaling for duplication transmission by another network device to the user equipment, the activation/deactivation signaling including indication on an activation status of the duplication transmission of a DRB in the other network device;

and the user equipment, the network device and the other network device are configured as at least two connectivities.

Supplement 57. The method according to any one of supplements 48-55, wherein, the activation/deactivation signaling includes indication on a use status of a leg used for the duplication transmission.

Supplement 58. The method according to supplement 57, wherein, the leg includes at least one of a network device, a cell group, a media access control (MAC) entity, a radio link control (RLC) entity and a logic channel.

Supplement 59. The method according to supplement 58, wherein, the indication on a use status of a leg used for the duplication transmission includes: a use status of a network device, or a cell group, or an MAC entity, or an RLC entity or a logic channel corresponding to an index or an identifier of the network device, or the cell group, or the MAC entity, or the RLC entity or the logic channel.

Supplement 60. The method according to supplement 59, wherein, for all DRBs that are currently configured for split transmission and/or duplication transmission, when the use status is valid, it indicates that the DRBs use the network device or cell group or MAC entity or RLC entity or logical channel to perform duplication transmission;

and when the use status is invalid, it indicates that the DRBs do not use the network device or cell group or MAC entity or RLC entity or logical channel to perform duplication transmission.

Supplement 61. The method according to any one of supplements 57-60, wherein, the activation/deactivation signaling is a media access control control element (MAC CE) or a packet data convergence protocol (PDCP) control protocol data unit (PDU).

Supplement 62. The method according to supplement 48, wherein, the activation/deactivation signaling includes indication on use statuses of legs of at least one DRB configured with duplication transmission.

Supplement 63. The method according to supplement 62, wherein, the activation/deactivation signaling further includes a mapping relationship between the at least one DRB configured with duplication transmission and the leg.

Supplement 64. The method according supplement 62 or 63, wherein, the activation/deactivation signaling is a MAC CE or a PDCP control PDU.

Supplement 65. The method according supplement 62 or 63, wherein, the indication on a use status includes: for at least one DRB configured with duplication transmission, a use status of at least one leg.

Supplement 66. The method according supplement 65, wherein, the leg includes at least one of a network device, a cell group, an MAC entity, an RLC entity and a logical channel;

when the use status is valid, it indicates that the network device or cell group or MAC entity or RLC entity or logical channel is used for performing duplication transmission;

and when the use status is invalid, it indicates that the network device or cell group or MAC entity or RLC entity or logical channel is not used for performing duplication transmission.

Supplement 67. The method according to any one of supplements 57-66, wherein the method further includes:

obtaining a use status related to duplication transmission of another network device or cell group than a network device or cell group transmitting the activation/deactivation signaling;

and the user equipment, the network device and the other network device are configured as at least two connectivities.

Supplement 68. A method for duplication transmission, including:

receiving from a network device a first configuration message for configuring a user equipment to perform operations of carrier aggregation and/or at least two connectivities; and receiving a second configuration message for duplication transmission, and/or activation/deactivation signaling for duplication transmission, from the network device.

Supplement 69. The method according to supplement 68, wherein, the second configuration message received from the network device includes at least one piece of the following information:

information on a leg used by at least one data radio bearer (DRB) in performing duplication transmission;

information on whether at least one leg is able to be used for duplication transmission; and information on a DRB using at least one leg configured to be used for duplication transmission.

Supplement 70. The method according to supplement 69, wherein, the information on a leg used by at least one data radio bearer (DRB) in performing duplication transmission includes at least one of the following: a network device identifier, a cell group identifier, an RLC entity identifier and a logic channel identifier used by the at least one DRB in performing duplication transmission;

the information on whether at least one leg is able to be used for duplication transmission includes: information on whether at least one network device or at least one cell group is able to be used for duplication transmission;

and the information on a DRB using at least one leg configured to be used for duplication transmission includes: information on a DRB using at least one network device or cell group configured to be used for duplication transmission.

Supplement 71. The method according to any one of supplements 68-70, wherein, the second configuration message received from the network device is radio resource control (RRC) signaling.

Supplement 72. The method according to supplement 71, wherein, the second configuration message is an RRCreconfiguration message or an RRCresume message or an RRC Setup message or an RRCReestablishment message.

Supplement 73. The method according to supplement 70, wherein, for a DRB, when at least two network device identifiers or at least two cell group identifiers used for duplication transmission configured for the DRB are identical, it indicates that the DRB performs duplication transmission in a carrier aggregation (CA) mode.

Supplement 74. The method according to any one of supplements 68-73, wherein, for at least one DRB configured with duplication transmission, its mode of duplication transmission is configured to be a carrier aggregation (CA) mode or a mode of using at least two network devices or at least two cell groups for duplication transmission.

Supplement 75. The method according to any one of supplements 68-73, wherein, the second configuration message and the first configuration message received from the network device are the same message.

Supplement 76. The method according to any one of supplements 68-75, wherein the receiving activation/deactivation signaling for duplication transmission from the network device includes:

receiving by a user equipment indication on an activation status of duplication transmission of at least one DRB respectively from at least two network devices;

and the user equipment and the at least two network devices are configured as at least two connectivities.

Supplement 77. The method according to supplement 76, wherein the method further includes:

determining by at least one MAC entity corresponding to at least one network device or at least one cell group according to the indication, an activation status of duplication transmission of at least one DRB related to the at least one MAC entity.

Supplement 78. The method according to supplement 76 or 77, wherein the method further includes:

for at least one DRB activating duplication transmission in the activation/deactivation signaling, performing duplication transmission of the DRB by using the network device or the cell group by the at least one MAC entity of the user equipment corresponding to at least one network device or at least one cell group; and/or for at least one DRB deactivating duplication transmission in the activation/deactivation signaling, not performing duplication transmission of the DRB by using the network device or the cell group by at least one MAC entity of the user equipment corresponding to at least one network device or at least one cell group.

Supplement 79. The method according to supplement 76 or 77, wherein the method further includes:

for at least one DRB activating duplication transmission in the activation/deactivation signaling, performing duplication transmission of the DRB by using an RLC entity and/or logical channel associated with the MAC entity configured for the DRB by the at least one MAC entity of the user equipment corresponding to at least one network device or at least one cell group; and/or for at least one DRB deactivating duplication transmission in the activation/deactivation signaling, not performing duplication transmission of the DRB by using an RLC entity and/or logical channel associated with the MAC entity configured for the DRB by the at least one MAC entity of the user equipment corresponding to at least one network device or at least one cell group.

Supplement 80. The method according to any one of supplements 76-79, wherein, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Supplement 81. The method according to supplement 68, wherein the receiving a second configuration message for duplication transmission, and/or activation/deactivation signaling for duplication transmission, from the network device, includes:

receiving indication on a use status of the leg used for the duplication transmission from the network device.

Supplement 82. The method according to supplement 81, wherein the method further includes:

for all DRBs that are currently configured for split transmission and/or duplication transmission, using a leg of a use status being valid to perform duplication transmission, and not using a leg of a use status being invalid to perform duplication transmission.

Supplement 83. The method according to supplement 81 or 82, wherein the method further includes:

for a DRB, for a leg that is not configured for split transmission of the DRB, ignoring the indication on using the leg for performing duplication transmission.

Supplement 84. The method according to any one of supplements 81-83, wherein, for a DRB performing duplication transmission by using a CA mode, when its duplication transmission is activated, all corresponding RLC entities and/or logical channels of the DRB in the network device or cell group are used for the duplication transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Supplement 85. The method according to any one of supplements 68-75, wherein the received activation/deactivation signaling includes indication on use statuses of legs of the at least one DRB configured with duplication transmission.

Supplement 86. The method according to supplement 85, wherein the method further includes:

according to the indication on use statuses of legs of the at least one DRB configured with duplication transmission, determining a leg used by the DRB in performing duplication transmission.

Supplement 87. The method according to supplement 85 or 86, wherein, for a DRB performing duplication transmission by using a CA mode, when its duplication transmission is activated, all corresponding RLC entities and/or logical channels of the DRB in the network device or cell group are used for transmission of the DRB, and when its duplication transmission is deactivated, a master RLC entity and/or master logical channel of the DRB in the network device or cell group is/are used for the duplication transmission of the DRB, and other corresponding RLC entities and/or logical channels are not used for the transmission of the DRB.

Supplement 88. A method for duplication transmission, including:

receiving by a user equipment a first configuration message for performing operations of carrier aggregation and/or at least two connectivities; and determining by the user equipment a leg used for performing duplication transmission.

Supplement 89. The method according to supplement 88, wherein the determining by the user equipment a leg used for performing duplication transmission includes:

determining the leg for performing duplication transmission according to at least one of a transmission success rate, a downlink measurement result and an uplink measurement result.

Supplement 90. The method according to supplement 88 or 89, wherein, for at least one DRB configured with duplication transmission, the user equipment determines the leg for performing duplication transmission of the DRB, or for all DRBs configured for duplication transmission, the user equipment determines the leg for duplication transmission.

Supplement 91. The method according to any one of supplements 88-90, wherein, a PDCP entity of the user equipment determines the leg.

What is claimed is:

1. A configuration and/or activation apparatus for duplication transmission, comprising:

a first transmitter configured to transmit a first configuration message for configuring a user equipment (UE) to perform operations of carrier aggregation and at least two connectivities to the UE; and a second transmitter configured to transmit second configuration message for duplication transmission of at least three RLC entities, and/or activation/deactivation signaling for duplication transmission of at least three RLC entities, to the UE, wherein the second configuration message transmitted to the UE comprises information on an RLC entity used by at least one data radio bearer (DRB) in performing duplication transmission, and the activation/deactivation signaling comprises indication on use statuses of RLC entities of at least one DRB configured with duplication transmission by a MAC CE, and the use statuses of RLC entities are ordered in an ascending order of indices of the RLC entities, wherein, when the use status is 1, the RLC entity is used for duplication transmission, and when the use status is 0, the RLC entity is not used for duplication transmission.

2. The apparatus according to claim 1, wherein, the second configuration message and the first configuration message are the same message.

3. The apparatus according to claim 1, wherein, the second configuration message transmitted to the UE further comprises at least one piece of the following information:

information on whether at least one RLC entity is able to be used for duplication transmission; and information on a DRB using at least one RLC entity configured to be used for duplication transmission.

4. The apparatus according to claim 3, wherein, the information on an RLC entity used by at least one data radio bearer (DRB) in performing duplication transmission comprises at least one of the following: a network device identifier, a cell group identifier, a radio link control (RLC) entity identifier and a logical channel identifier used by the at least one DRB in performing duplication transmission;

the information on whether at least one RLC entity is able to be used for duplication transmission comprises: information on whether at least one network device or at least one cell group is able to be used for duplication transmission;

and the information on a DRB using at least one RLC entity configured to be used for duplication transmission comprises: information on a DRB using at least one network device or cell group configured to be used for duplication transmission.

5. The apparatus according to claim 1, wherein, the second configuration message is radio resource control (RRC) signaling.

6. The apparatus according to claim 1, wherein, the second transmitter of a network device transmits the activation/deactivation signaling for duplication transmission to the UE, the activation/deactivation signaling comprising indication on an activation status of the duplication transmission of a DRB in the network device; and/or the second transmitter of another network device transmits the activation/deactivation signaling for duplication transmission to the UE, the activation/deactivation signaling comprising indication on an activation status of the duplication transmission of a DRB in the other network device;

and the UE, the network device and the other network device are configured as at least two connectivities.

7. The apparatus according to claim 1, wherein, the activation/deactivation signaling comprises indication on a use status of an RLC entity used for the duplication transmission.

8. The apparatus according to claim 7, wherein, the RLC entity comprises at least one of a network device, a cell group, a media access control (MAC) entity, a radio link control (RLC) entity and a logical channel.

9. The apparatus according to claim 8, wherein, the indication on a use status of an RLC entity used for the duplication transmission comprises: a use status of a network device, or a cell group, or an MAC entity, or an RLC entity or a logical channel corresponding to an index or an identifier of the network device, or the cell group, or the MAC entity, or the RLC entity or the logical channel.

10. The apparatus according to claim 1, wherein, the RLC entity comprises at least one of the following: a cell group identifier, a radio link control (RLC) entity identifier and a logical channel identifier.

11. The apparatus according to claim 1, wherein, the activation/deactivation signaling further comprises a mapping relationship between the at least one DRB configured with duplication transmission and the RLC entity.

12. An apparatus for duplication transmission, comprising:

a first receiver configured to receive from a network device a first configuration message for configuring a user equipment (UE) to perform operations of carrier aggregation and at least two connectivities; and a second receiver configured to receive a second configuration message for duplication transmission of at least three RLC entities, and/or activation/deactivation signaling for duplication transmission of at least three RLC entities, from the network device, wherein the second configuration message comprises information on an RLC entity used by at least one data radio bearer (DRB) in performing duplication transmission, and wherein the activation/deactivation signaling received by the second receiver comprises indication on use statuses of RLC entities of at least one DRB configured with duplication transmission by a MAC CE, and the use statuses of RLC entities are ordered in an ascending order of indices of the RLC entities, wherein, when the use status is 1, the RLC entity is used for duplication transmission, and when the use status is 0, the RLC entity is not used for duplication transmission.

13. The apparatus according to claim 12, wherein, the second configuration message received from the network device further comprises at least one piece of the following information:

information on whether at least one RLC entity is able to be used for duplication transmission; and information on a DRB using at least one RLC entity configured to be used for duplication transmission.

14. The apparatus according to claim 13, wherein, the information on an RLC entity used by at least one data radio bearer (DRB) in performing duplication transmission comprises at least one of the following: a network device identifier, a cell group identifier, a radio link control (RLC) entity identifier and a logical channel identifier used by the at least one DRB in performing duplication transmission;

the information on whether at least one RLC entity is able to be used for duplication transmission comprises: information on whether at least one network device or at least one cell group is able to be used for duplication transmission;

and the information on a DRB using at least one RLC entity configured to be used for duplication transmission comprises: information on a DRB using at least one network device or cell group configured to be used for duplication transmission.

15. The apparatus according to claim 12, wherein, the second configuration message received from the network device is radio resource control (RRC) signaling.

16. The apparatus according to claim 12, wherein, the second receiver receives indication on an activation status of duplication transmission of at least one DRB respectively from at least two network devices;

and the UE and the at least two network devices are configured as at least two connectivities.

17. The apparatus according to claim 16, wherein the apparatus further comprises:

first processor circuitry configured to enable at least one media access control (MAC) entity of the UE corresponding to at least one network device or at least one cell group to determine an activation status of duplication transmission of at least one DRB related to the MAC entity according to the indication.

18. The apparatus according to claim 16, wherein the apparatus further comprises:

a first transmitter configured to enable at least one MAC entity of the UE corresponding to at least one network device or at least one cell group, for at least one DRB activating duplication transmission in the activation/deactivation signaling, to perform duplication transmission of the DRB by using the network device or the cell group, and/or enable at least one MAC entity of the UE corresponding to at least one network device or at least one cell group, for at least one DRB deactivating duplication transmission in the activation/deactivation signaling, not to perform duplication transmission of the DRB by using the network device or the cell group.

19. The apparatus according to claim 12, wherein, the second receiver receives indication on a use status of the RLC entity used for the duplication transmission from the network device.

20. The apparatus according to claim 12, wherein the apparatus further comprises:

second processor circuitry configured to, according to the indication on use statuses of the RLC entities of the at least one DRB configured with duplication transmission, determine an RLC entity used by the DRB in performing duplication transmission.

* * * * *